(12) United States Patent
Yoon et al.

(10) Patent No.: US 12,543,197 B2
(45) Date of Patent: Feb. 3, 2026

(54) DATA TRANSMISSION/RECEPTION METHOD, DEVICE, AND SYSTEM IN WIRELESS COMMUNICATION SYSTEM

(71) Applicant: WILUS INSTITUTE OF STANDARDS AND TECHNOLOGY INC., Gyeonggi-do (KR)

(72) Inventors: Youngjoon Yoon, Gyeonggi-do (KR); Minseok Noh, Gyeonggi-do (KR); Juhyung Son, Gyeonggi-do (KR); Geunyoung Seok, Gyeonggi-do (KR); Jinsam Kwak, Gyeonggi-do (KR)

(73) Assignee: WILUS INSTITUE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/991,336

(22) Filed: Dec. 20, 2024

(65) Prior Publication Data

US 2025/0126628 A1  Apr. 17, 2025

Related U.S. Application Data

(63) Continuation of application No. PCT/KR2023/015252, filed on Oct. 4, 2023.

(30) Foreign Application Priority Data

Sep. 30, 2022 (KR) .......................... 10-2022-0125621
Dec. 16, 2022 (KR) .......................... 10-2022-0177571
Feb. 17, 2023 (KR) .......................... 10-2023-0021686

(51) Int. Cl.
*H04W 72/04* (2023.01)
*H04B 17/318* (2015.01)
(Continued)

(52) U.S. Cl.
CPC .......... *H04W 72/25* (2023.01); *H04B 17/328* (2023.05); *H04L 5/0048* (2013.01)

(58) Field of Classification Search
USPC ............................................ 370/329
See application file for complete search history.

(56) References Cited

U.S. PATENT DOCUMENTS

2020/0053743 A1\* 2/2020 Cheng .................. H04W 72/23
2020/0146066 A1\* 5/2020 Nguyen ................ H04W 72/12
(Continued)

FOREIGN PATENT DOCUMENTS

CN         117545092 A  \*  2/2024
KR    10-2022-0055501       5/2022
(Continued)

OTHER PUBLICATIONS

R1-2212539, Nov. 14-18, 2022, FL Summary#1 for AI 9.4.2—Co-Channel Coexistence for LTE and NR. (Year: 2022).\*
(Continued)

*Primary Examiner* — Maharishi V Khirodhar
(74) *Attorney, Agent, or Firm* — WOMBLE BOND DICKINSON (US) LLP

(57) ABSTRACT

A method by which a terminal is to transmit a signal in a wireless communication system is disclosed. The terminal determines a specific resource set from among resource sets formed of one or more candidate resources allocated for the transmission of a physical sidelink shared channel (PSSCH), wherein: some or all of the one or more candidate resources constituting the resource sets overlap with a first resource for transmitting a first legacy signal of the terminal; and, if a first priority of the PSSCH is higher than a second priority of the legacy signal, the specific resource set can be determined by excluding, from the one or more candidate resources, at least one first candidate resource overlapping with the first
(Continued)

resource. Afterward, the terminal can transmit the PSSCH on the specific resource set.

10 Claims, 40 Drawing Sheets

(51) Int. Cl.
*H04L 5/00* (2006.01)
*H04W 72/25* (2023.01)
*H04W 76/00* (2018.01)
*H04W 88/08* (2009.01)

(56) References Cited

U.S. PATENT DOCUMENTS

| | | | |
|---|---|---|---|
| 2023/0319648 A1 | | 10/2023 | Nguyen et al. |
| 2024/0422769 A1* | | 12/2024 | Yoshioka .............. H04W 72/04 |

FOREIGN PATENT DOCUMENTS

| | | | | |
|---|---|---|---|---|
| KR | 10-2022-0071963 | | 5/2022 | |
| KR | 10-2022-0125621 | * | 8/2022 | ............ H04W 72/25 |
| WO | WO-2020069111 A1 | * | 4/2020 | ............ H04W 72/02 |
| WO | 2021/075938 | | 4/2021 | |
| WO | 2022/086082 | | 4/2022 | |
| WO | 2023/191485 | | 10/2023 | |
| WO | WO-2023206482 A1 | * | 11/2023 | ........... H04L 1/1812 |
| WO | WO-2023212025 A1 | * | 11/2023 | ........... H04L 5/0053 |
| WO | 2024/072191 | | 4/2024 | |

OTHER PUBLICATIONS

R1-2207636, Aug. 22-26, 2022, FL Summary#1 for AI 9.4.2—Co-Channel Coexistence for LTE and NR. (Year: 2022).*
International Search Report for PCT/KR2023/015252 mailed on Jan. 25, 2024 and its English translation from WIPO (now published as WO2024/072191).
Written Opinion of the International Searching Authority for PCT/KR2023/015252 mailed on Jan. 25, 2024 and its English translation by Google Translate (now published as WO2024/072191).
InterDigital, Inc.: "In-device Coexistence between LTE and NR V2X Sidelinks", 3GPP TSG RAN WG1 #99, R1-1912741, Reno, USA, Nov. 8, 2019 pp. 1-2.
Office Action dated Jan. 31, 2025 for Korean Patent Application No. 10-2024-7042230 and its English translation provided by Applicant's foreign counsel.
Ericsson: "Co-channel coexistence between LTE sidelink and NR sidelink", 3GPP TSG RAN WG1 #110, R1-2207565, Toulouse, France, Aug. 12, 2022, pp. 1-13.
Office Action dated Aug. 1, 2025 for Korean Patent Application No. 10-2024-7042230 and its English translation provided by Applicant's foreign counsel.

* cited by examiner

DATA TRANSMISSION/RECEPTION METHOD, DEVICE, AND SYSTEM IN WIRELESS COMMUNICATION SYSTEM

CROSS REFERENCE TO RELATED APPLICATIONS

This application is a continuation of International Patent Application No. PCT/KR2023/015252, which claims the priority to Korean Patent Application No. 10-2022-0177571 filed in the Korean Intellectual Property Office on Dec. 16, 2022, Korean Patent Application No. 10-2022-0125621 filed in the Korean Intellectual Property Office on Sep. 30, 2022, and Korean Patent Application No. 10-2023-0021686 filed in the Korean Intellectual Property Office on Feb. 17, 2023, the entire contents of which are incorporated herein by reference.

TECHNICAL FIELD

The present disclosure relates to a wireless communication system. Specifically, the present disclosure relates to a radio resource allocation method, a transmission method, a device, and a system for a UE performing NR sidelink communication when UEs operating NR sidelink and LTE sidelink communication co-exist in a co-channel in a wireless communication system.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

A sidelink (SL) refers to a communication method in which a direct link is established between user equipments (UEs), and voice or data is directly exchanged between UEs without going through a base station (BS). The SL is being considered as a method for solving the burden of the base station due to the rapidly increasing data traffic.

Vehicle-to-everything (V2X) refers to a communication technology of exchanging information with other vehicles, pedestrians, infrastructure-built objects, etc. through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities, there is a need for enhanced mobile broadband communication compared to the legacy radio access technology (RAT). Accordingly, communication systems considering services or UEs sensitive to reliability and latency are under discussion, and a next-generation radio access technology in consideration of enhanced mobile broadband communication, massive machine type communication (MTC), and ultra-reliable and low latency communication (URLLC) may be referred to as new radio access technology (RAT) or new radio (NR). Even in NR, vehicle-to-everything (V2X) communication can be supported.

V2X refers to a communication technology of exchanging information with other vehicles, pedestrians, infrastructure, networks, etc. According to the type of a UE with which a vehicle performs communication, V2X may be classified into vehicle-to-vehicle (V2V), vehicle-to-pedestrian (V2P), vehicle-to-infrastructure (V2I), and vehicle-to-network (V2N). V2X communication may be provided through a PC5 interface using SL in an in-coverage situation or an out-of-coverage situation and/or a Uu interface using DL/UL.

For example, for SL communication related to services having requirements with high reliability or services having requirements with relatively high reliability, an SL HARQ feedback operation and/or mechanism of a UE may be useful.

DISCLOSURE OF INVENTION

Technical Problem

The present disclosure of the present disclosure is to provide a method for efficiently transmitting a signal, and a device using the same in a wireless communication system. Specifically, the present disclosure is to provide a channel transmission method for efficiently performing transmission, and a device using the same in a wireless communication system.

In addition, the present disclosure provides a radio resource allocation method, a transmission method, a device, and a system for a UE performing NR sidelink communication when UEs performing NR sidelink and LTE sidelink communication co-exist in a co-channel in a wireless communication system.

Solution to Problem

In a wireless communication system, a terminal for transmitting a physical uplink shared channel (PUSCH) to a base station includes: a communication module; and a processor for controlling the communication module, wherein the processor is configured to: determine a specific resource set from among resource sets including one or more candidate resources allocated for transmission of a physical sidelink shared channel (PSSCH), wherein when some or all of the one or more candidate resources constituting the resource sets overlap with a first resource for transmitting a first legacy signal of the terminal, and a first priority of the PSSCH is higher than a second priority of the legacy signal, the specific resource set is determined by excluding, from among the one or more candidate resources, at least one first candidate resource overlapping with the first resource; and transmit the PSSCH on the specific resource set.

In addition, in the present disclosure, when the first legacy signal is a periodically transmitted signal, a candidate resource set is allocated at each transmission period of the legacy signal, and the specific resource set is determined in consideration all the candidate resource set allocated at each transmission period.

In addition, in the present disclosure, the processor is configured to compare the first priority with the second priority, wherein some or all of the resource sets overlap with a candidate resource set on a time axis.

In addition, in the present disclosure, the processor is configured to: receive, from a second terminal, a second legacy signal including a third priority and resource allocation information of the second terminal; and when a second resource by the resource allocation information overlaps with some or all of the one or more candidate resources on a time axis, compare reference signal received power (RSRP) of the second legacy signal with a threshold value.

In addition, in the present disclosure, when the RSRP is greater than the threshold value, the specific resource set is determined by further excluding, from the one or more candidate resources, at least one second candidate resource overlapping with the second resource by the resource allocation information.

In addition, in the present disclosure, the threshold value is selected from among multiple threshold values according to the first priority and the third priority.

In addition, the present disclosure provides a method including: determining a specific resource set from among resource sets including one or more candidate resources allocated for transmission of a physical sidelink shared channel (PSSCH), wherein when some or all of the one or more candidate resources constituting the resource sets overlap with a first resource for transmitting a first legacy signal of the terminal, and a first priority of the PSSCH is higher than a second priority of the legacy signal, the specific resource set is determined by excluding, from among the one or more candidate resources, at least one first candidate resource overlapping with the first resource; and transmitting the PSSCH on the specific resource set.

Advantageous Effects of Invention

The present disclosure provides a method for efficiently transmitting a signal, and a device using the same in a wireless communication system. In addition, the present disclosure provides a channel transmission method for efficiently performing transmission, and a device using the same in a wireless communication system.

According to an embodiment of the present disclosure, when UEs performing NR sidelink and LTE sidelink communication co-exist in a co-channel, the UE performing NR sidelink communication can allocate a radio resource for a control and shared channel and stably perform transmission of the control and shared channel.

The effects obtainable in the present disclosure are not limited to the above-mentioned effects, and other effects not mentioned will be clearly understood by those of ordinary skill in the art from the following description.

BEST MODE FOR CARRYING OUT THE INVENTION

Figure 1:
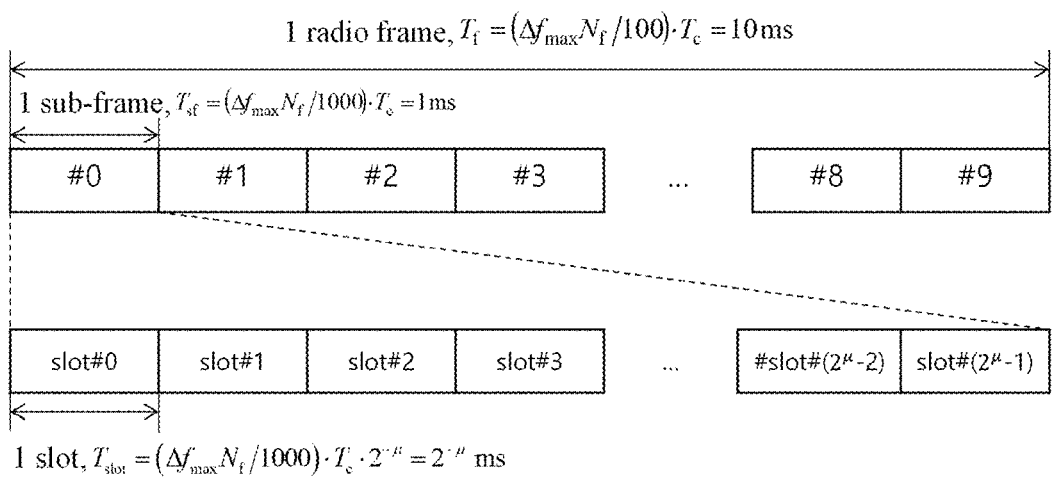
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f / 100) * T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include 2 slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
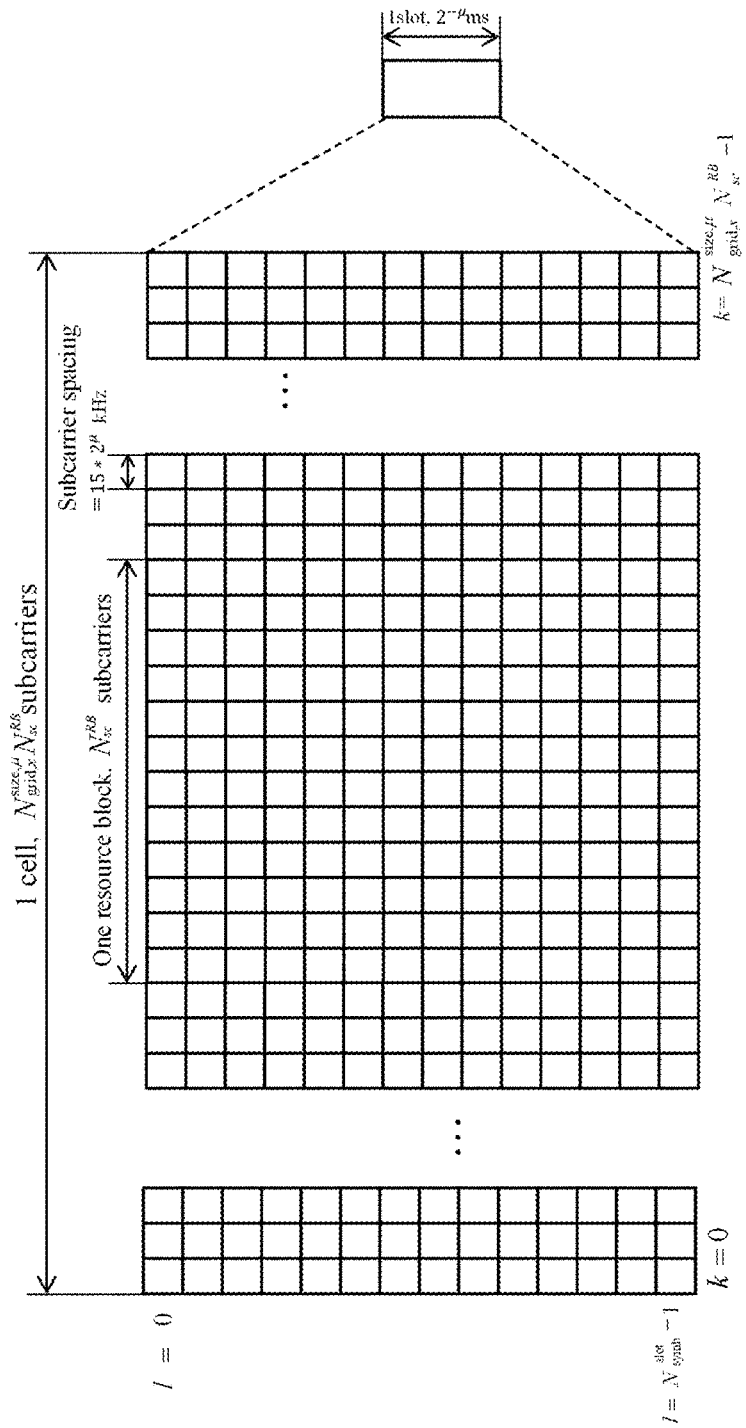
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{rid,x}*N^{RBs}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$(x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 | | index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | | 28 | D | D | D | D | D | D | D | D | D | D | D | D | X | U |
| 1 | U | U | U | U | U | U | U | U | U | U | U | U | U | U | | 29 | D | D | D | D | D | D | D | D | D | D | D | X | X | U |
| 2 | X | X | X | X | X | X | X | X | X | X | X | X | X | X | | 30 | D | D | D | D | D | D | D | D | D | D | X | X | X | U |
| 3 | D | D | D | D | D | D | D | D | D | D | D | D | D | X | | 31 | D | D | D | D | D | D | D | D | D | D | D | X | U | U |
| 4 | D | D | D | D | D | D | D | D | D | D | D | D | X | X | | 32 | D | D | D | D | D | D | D | D | D | D | X | X | U | U |
| 5 | D | D | D | D | D | D | D | D | D | D | D | X | X | X | | 33 | D | D | D | D | D | D | D | D | D | X | X | X | U | U |
| 6 | D | D | D | D | D | D | D | D | D | D | X | X | X | X | | 34 | D | X | U | U | U | U | U | U | U | U | U | U | U | U |
| 7 | D | D | D | D | D | D | D | D | D | X | X | X | X | X | | 35 | D | D | X | U | U | U | U | U | U | U | U | U | U | U |
| 8 | X | X | X | X | X | X | X | X | X | X | X | X | X | U | | 36 | D | D | D | X | U | U | U | U | U | U | U | U | U | U |
| 9 | X | X | X | X | X | X | X | X | X | X | X | X | U | U | | 37 | D | X | X | U | U | U | U | U | U | U | U | U | U | U |
| 10 | X | U | U | U | U | U | U | U | U | U | U | U | U | U | | 38 | D | D | X | X | U | U | U | U | U | U | U | U | U | U |
| 11 | X | X | U | U | U | U | U | U | U | U | U | U | U | U | | 39 | D | D | D | X | X | U | U | U | U | U | U | U | U | U |
| 12 | X | X | X | U | U | U | U | U | U | U | U | U | U | U | | 40 | D | X | X | X | U | U | U | U | U | U | U | U | U | U |
| 13 | X | X | X | X | U | U | U | U | U | U | U | U | U | U | | 41 | D | D | X | X | X | U | U | U | U | U | U | U | U | U |
| 14 | X | X | X | X | X | U | U | U | U | U | U | U | U | U | | 42 | D | D | D | X | X | X | U | U | U | U | U | U | U | U |
| 15 | X | X | X | X | X | X | U | U | U | U | U | U | U | U | | 43 | D | D | D | D | D | D | D | D | D | X | X | X | X | U |
| 16 | D | X | X | X | X | X | X | X | X | X | X | X | X | X | | 44 | D | D | D | D | D | D | X | X | X | X | X | X | U | U |
| 17 | D | D | X | X | X | X | X | X | X | X | X | X | X | X | | 45 | D | D | D | D | D | D | X | X | X | X | U | U | U | U |
| 18 | D | D | D | X | X | X | X | X | X | X | X | X | X | X | | 46 | D | D | D | D | X | U | D | D | D | D | D | X | X | U |
| 19 | D | X | X | X | X | X | X | X | X | X | X | X | X | U | | 47 | D | D | X | U | U | U | U | D | D | X | U | U | U | U |
| 20 | D | D | X | X | X | X | X | X | X | X | X | X | X | U | | 48 | D | X | U | U | U | U | U | D | X | U | U | U | U | U |
| 21 | D | D | D | X | X | X | X | X | X | X | X | X | X | U | | 49 | D | D | D | D | X | U | D | D | D | D | X | X | X | U |
| 22 | D | X | X | X | X | X | X | X | X | X | X | X | U | U | | 50 | D | D | X | X | U | U | U | D | D | X | X | U | U | U |
| 23 | D | D | X | X | X | X | X | X | X | X | X | X | U | U | | 51 | D | X | X | U | U | U | U | D | X | X | U | U | U | U |
| 24 | D | D | D | X | X | X | X | X | X | X | X | X | U | U | | 52 | D | X | X | X | X | U | D | X | X | X | X | X | X | U |
| 25 | D | X | X | X | X | X | X | X | X | X | X | U | U | U | | 53 | D | D | X | X | X | X | U | D | D | X | X | X | X | U |
| 26 | D | D | X | X | X | X | X | X | X | X | X | U | U | U | | 54 | X | X | X | X | X | X | X | D | D | D | D | D | D | D |
| 27 | D | D | D | X | X | X | X | X | X | X | X | U | U | U | | 55 | D | D | X | X | X | U | U | D | D | D | D | D | D | D |
| 56~255 | | | | | | | | | | | | | | | | Reserved | | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
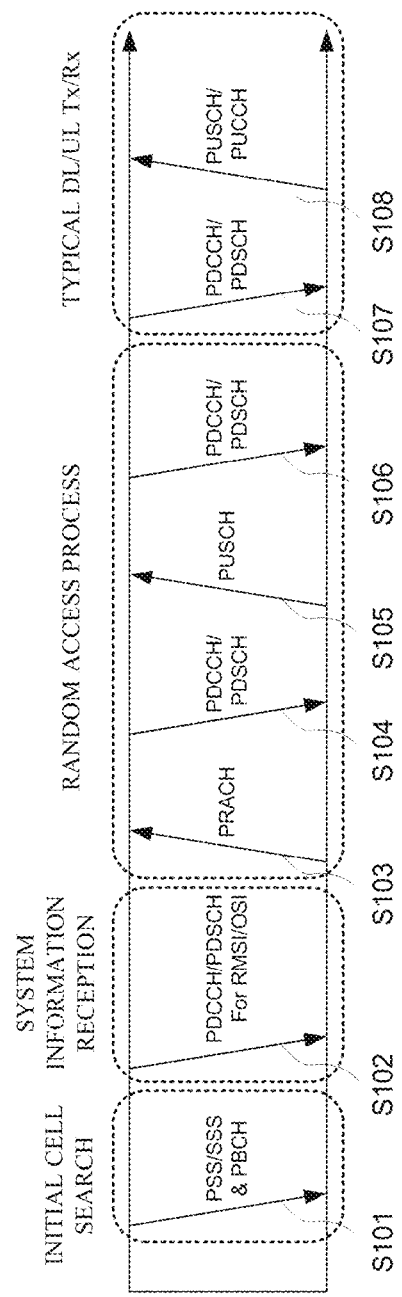
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NcellID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Figure 4A:
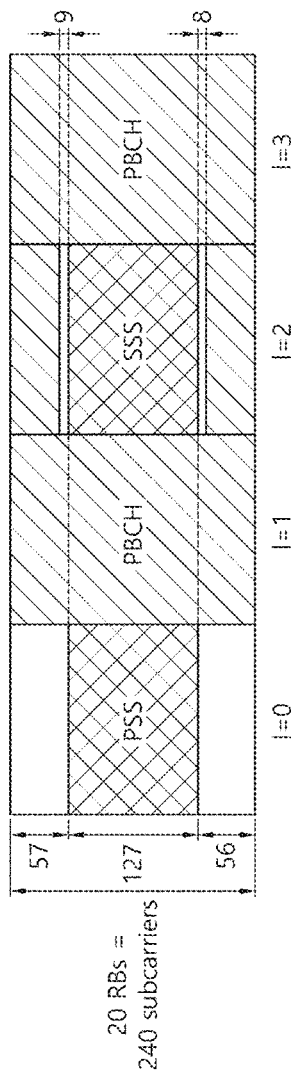
FIGS. 4A and 4B illustrate an SS/PBCH block for initial cell access in a 3GPP NR system.

Referring to FIG. 4(a), a synchronization signal (SS) will be described in more detail. The synchronization signal can be classified into PSS and SSS. The PSS may be used to obtain time region synchronization and/or frequency region synchronization, such as OFDM symbol synchronization and slot synchronization. The SSS can be used to obtain frame synchronization and cell group ID. Referring to FIG. 4(a) and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/ relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v |
|  |  | 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID} = 3N^{(1)}_{ID} + N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$
$$m = (n + 43N^{(2)}_{ID}) \mod 127$$
$$0 \le 0 < 1$$

Here, x(i+7)=(x(i+4)+x(i))mod 2 and is given as $$[x(6)\ x(5)\ x(4)\ x(3)\ x(2)\ x(1)\ x(0)] = [1\ 1\ 1\ 0\ 1\ 1\ 0] \quad (6)$$

Further, the sequence dSSS(n) of the SSS is as follows.

$$d_{SSS}(n) = [1 - 2x_0((n + m_0) \mod 127)][1 - 2x_1((n + m_1) \mod 127)]$$

$$m_0 = 15\left\lfloor \frac{N_{ID}^{(1)}}{112} \right\rfloor + 5N_{ID}^{(2)}$$

$$m_1 = N_{ID}^{(1)} \mod 112$$

$$0 \le n < 127$$

$$x_0(i + 7) = (x_0(i + 4) + x_0(i)) \mod 2$$

Here, $x_1(i + 7) = (x_1(i + 1) + x_1(i)) \mod 2$ and is given as $$[x_0(6)\, x_0(5)\, x_0(4)\, x_0(3)\, x_0(2)\, x_0(1)\, x_0(0)] = [0\,0\,0\,0\,0\,0\,1]$$

$$[x_1(6)\, x_1(5)\, x_1(4)\, x_1(3)\, x_1(2)\, x_1(1)\, x_1(0)] = [0\,0\,0\,0\,0\,0\,1]$$

Figure 4B:
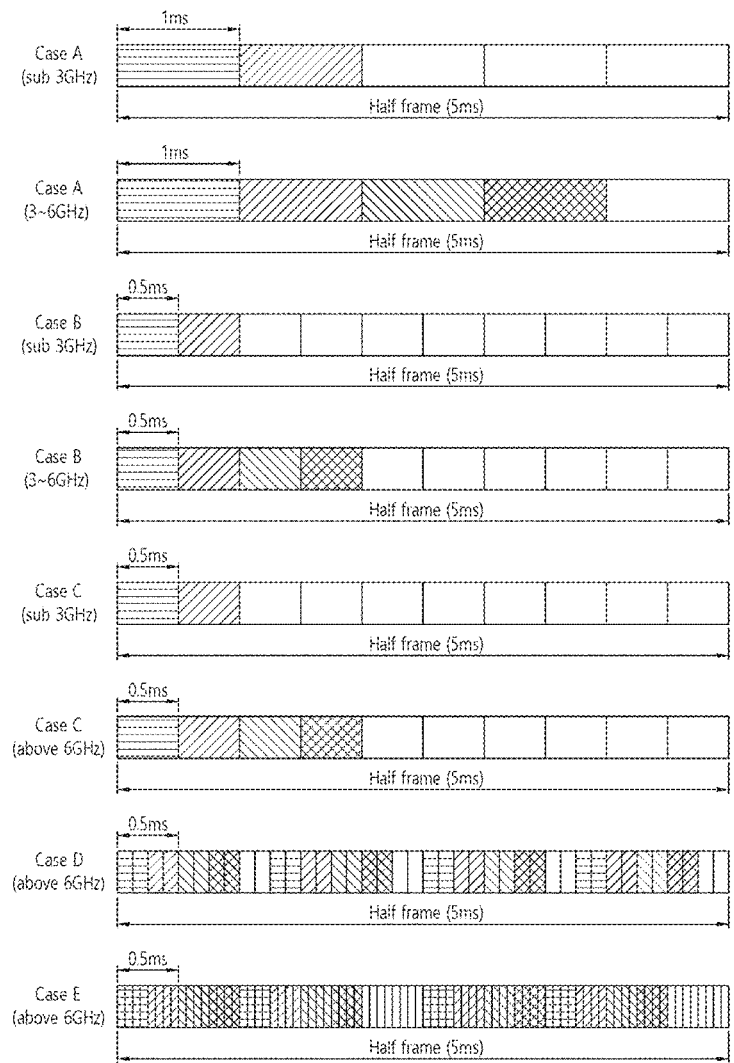

A radio frame with a 10 ms length may be divided into two half frames with a 5 ms length. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
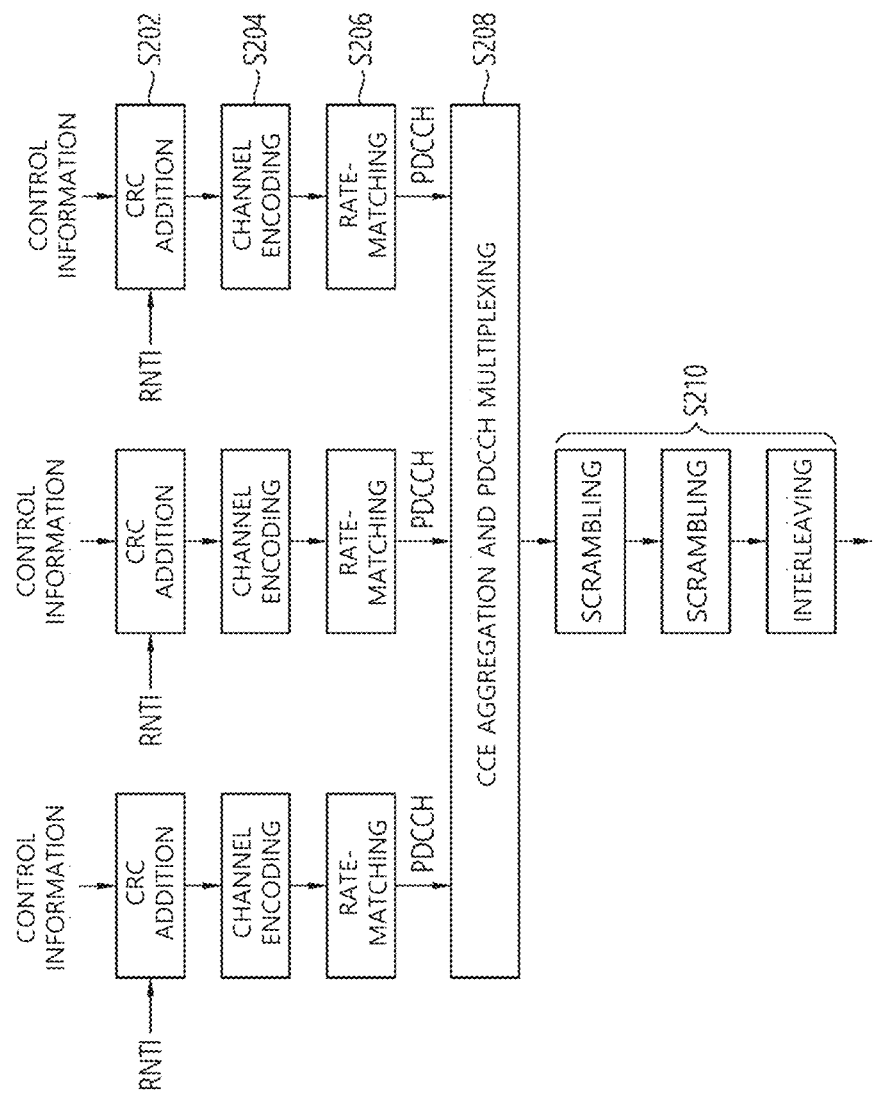
FIGS. 5A and 5B illustrates a procedure for transmitting control information and a control channel in a 3GPP NR system.
Figure 5B:
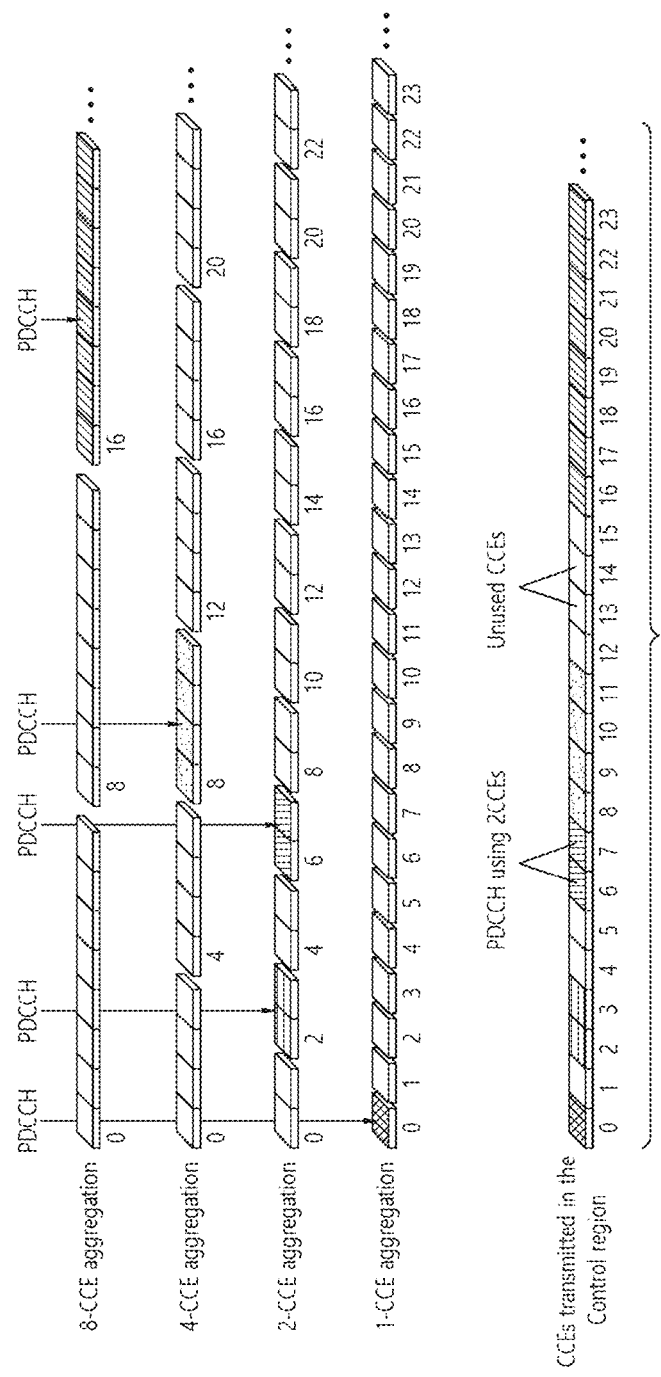

FIG. 5 illustrates a procedure for transmitting control information and a control channel in a 3GPP NR system. Referring to FIG. 5(a), the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
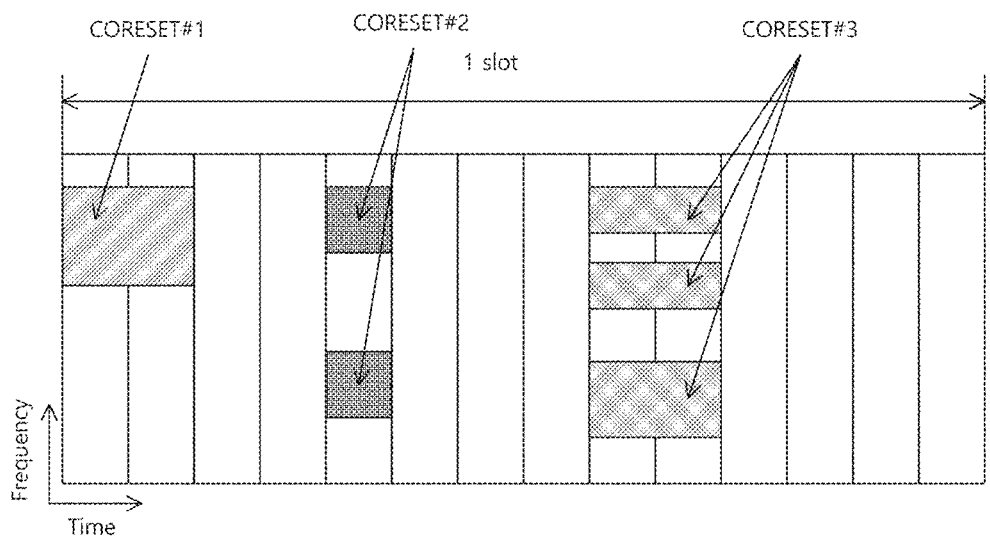
FIG. 6 illustrates a control resource set (CORESET) in which a physical downlink control channel (PDCCH) may be transmitted in a 3GPP NR system.

FIG. 6 illustrates a control resource set (CORESET) in which a physical downlink control channel (PDCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency region designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
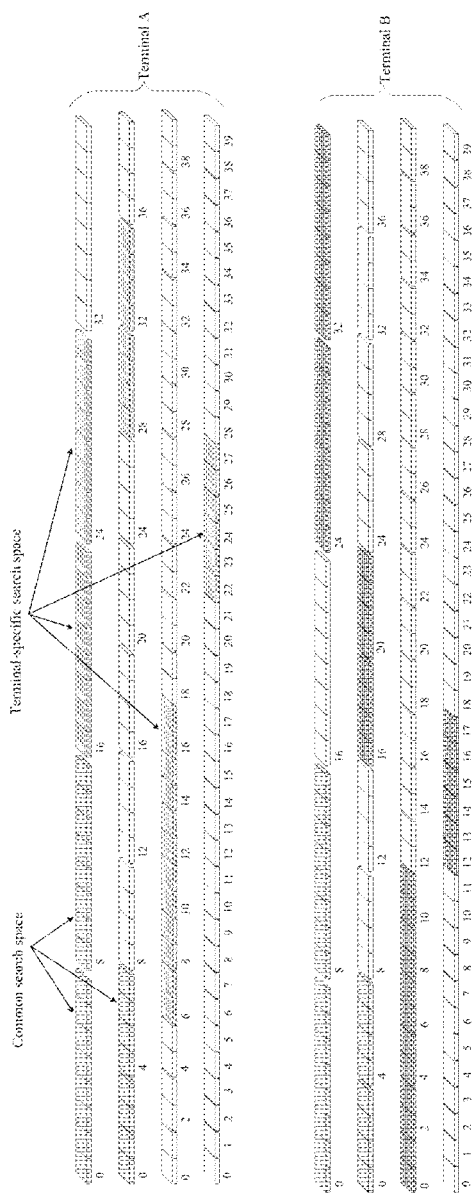
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , $d(M_{symbol}-1)$. Here, $M_{symbol}$ may be $M_{bit}/2$. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
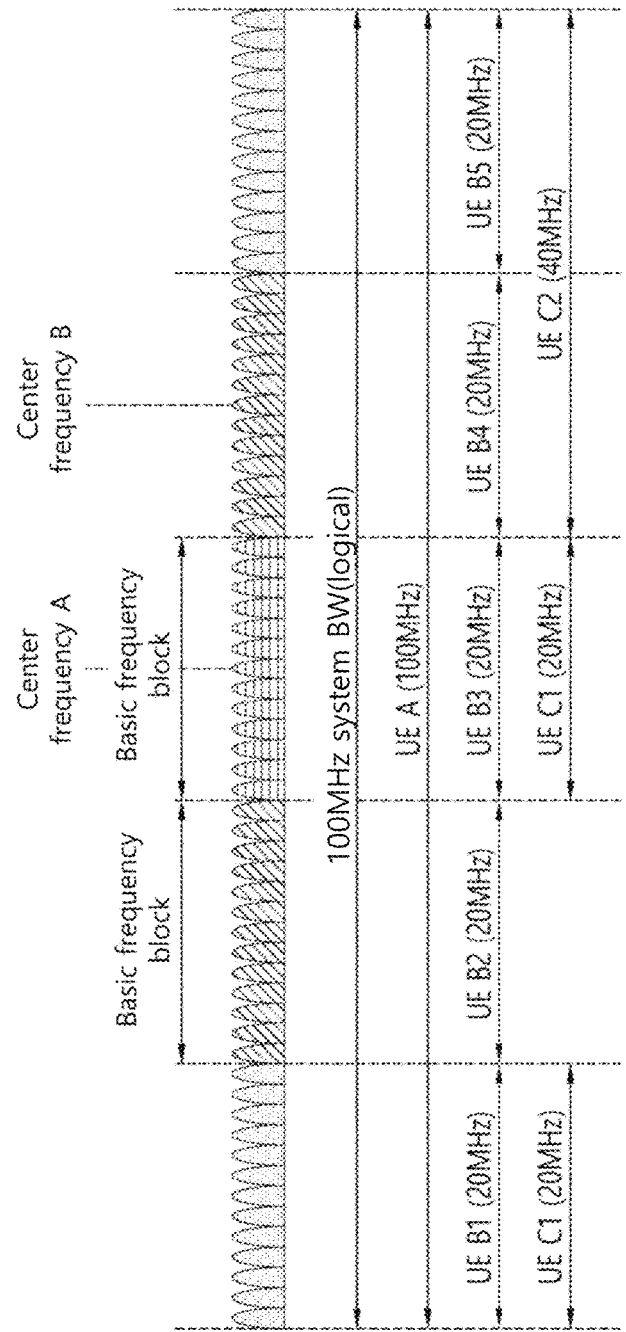
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
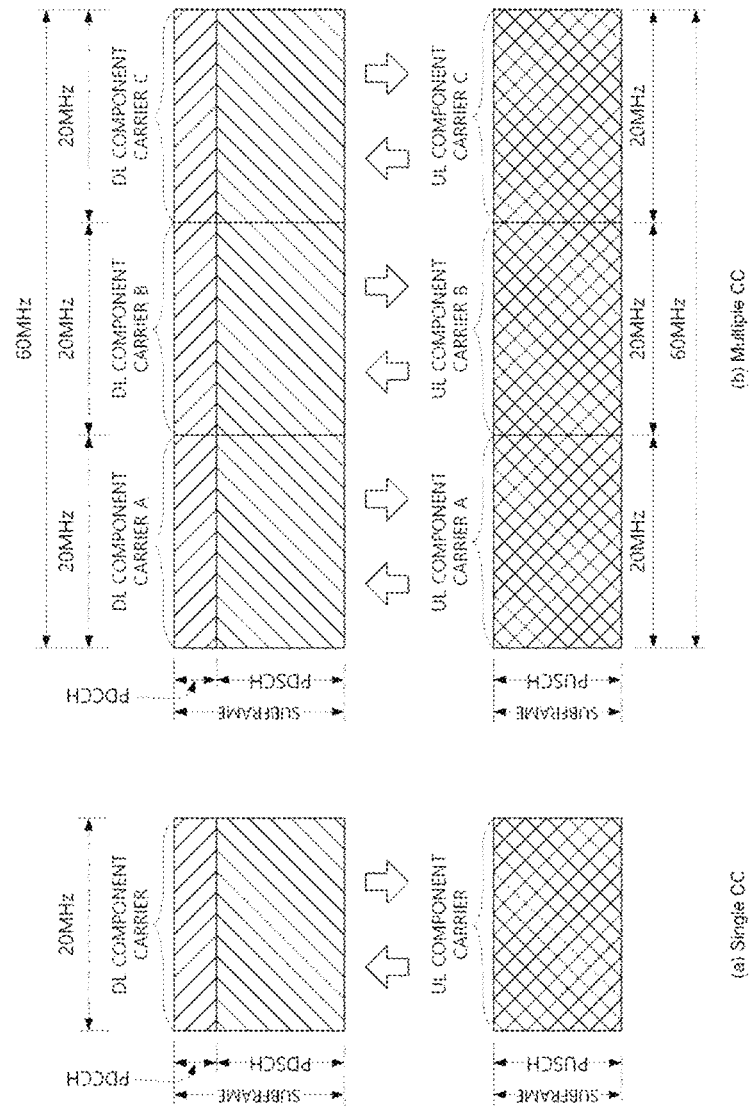
FIG. 9 is a diagram for explaining single carrier communication and multiple carrier communication.

FIG. 9 is a drawing for explaining single carrier communication and multiple carrier communication. Particularly, FIG. 9(*a*) shows a single carrier subframe structure and FIG. 9(*b*) shows a multi-carrier subframe structure.

Referring to FIG. 9(*a*), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time region, and perform data transmission or reception through a UL/DL time unit. Referring to FIG. 9(*b*), three 20 MHz component carriers (CCs) can be aggregated into each of UL and DL, so that a bandwidth of 60 MHz can be supported. Each CC may be adjacent or non-adjacent to one another in the frequency region. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
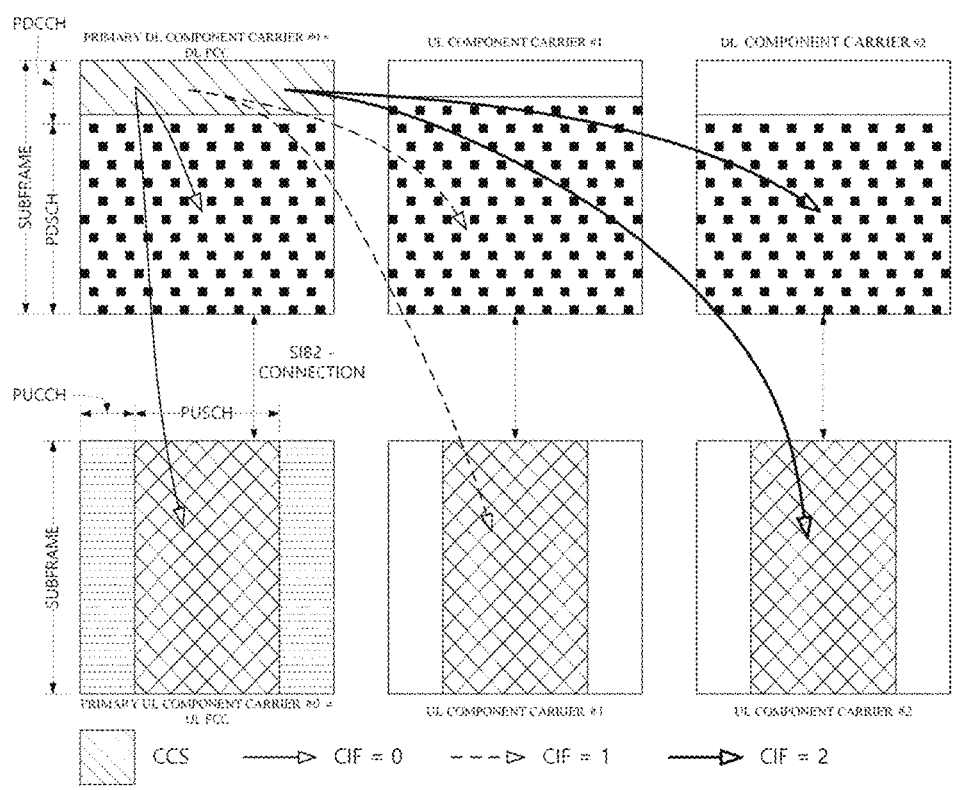
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIG. 9 and may be replaced with slots.

Figure 11:
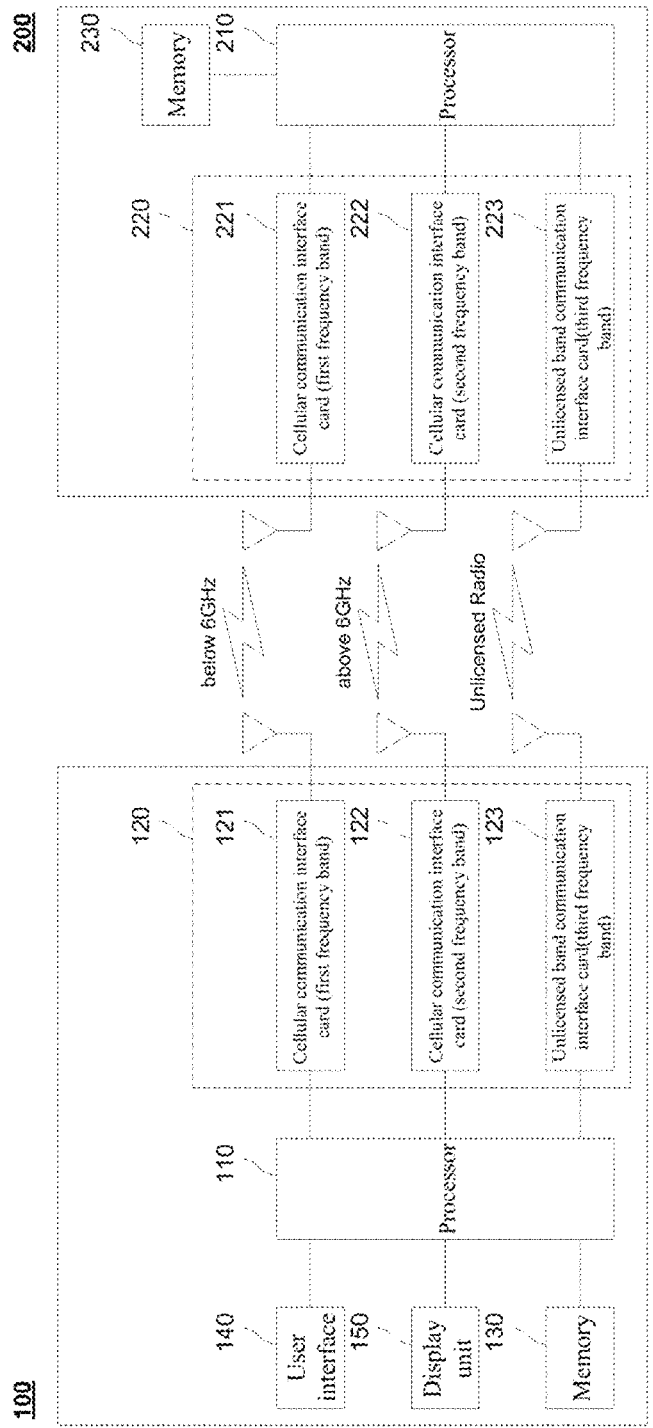
FIG. 11 is a block diagram showing the configurations of a UE and a base station according to an embodiment of the present disclosure.

FIG. 11 is a block diagram showing the configurations of a UE and a base station according to an embodiment of the present disclosure.

In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

Figure 12:
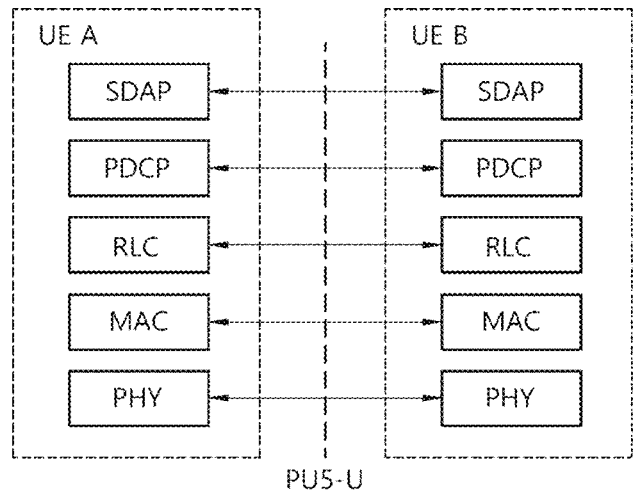
FIG. 12(a) illustrates a user plane protocol stack of NR.
FIG. 12(b) illustrates a control plane protocol stack of NR.
Figure 12:
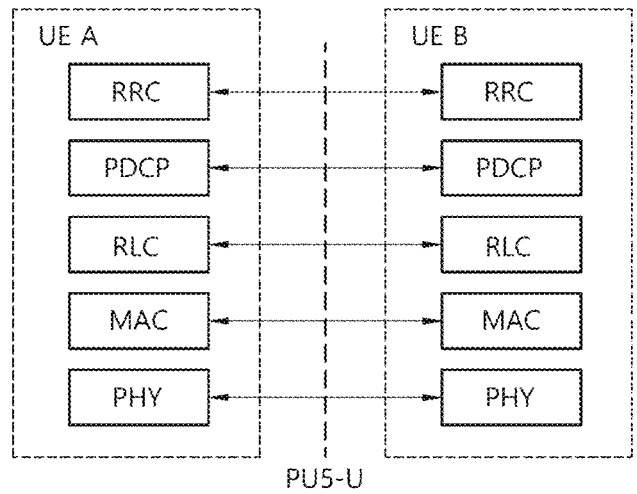

FIG. 12 illustrates radio protocol architecture for SL communication.

Referring to FIG. 12, FIG. 12(*a*) illustrates a user plane protocol stack of NR, and FIG. 12(*b*) illustrates a control plane protocol stack of NR. Hereinafter, a sidelink synchronization signal (SLSS) and synchronization information are described.

Specifically, the SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS).

A physical sidelink broadcast channel (PSBCH) may may be a (broadcast) channel through which basic (system) information that needs to be known first by a UE before SL signal transmission and reception. For example, the basic information may be information related to the SLSS, a duplex mode (DM), time division duplex uplink/downlink (TDD UL/DL) configuration, information related to a resource pool, an application type related to the SLSS, a subframe offset, broadcast information, etc.

The S-PSS, the S-SSS, and the PSBCH may be included in a block format (e.g., a SL synchronization signal (SS)/PSBCH block, hereinafter referred to as a sidelink-synchronization signal block (S-SSB)) for supporting periodic transmission. The S-SSB may have the same numerology (i.e., SCS and CP length) as a physical sidelink control channel (PSCCH)/physical sidelink shared channel (PSSCH) within a carrier, and a transmission bandwidth may exist within a (pre-)configured sidelink bandwidth part (SL BWP). In addition, a frequency position of the S-SSB may be (pre-)configured. Therefore, the UE does not need to perform hypothesis detection in the frequency to discover the S-SSB in the carrier.

Each SLSS may have a physical layer sidelink synchronization identity (ID), and the value thereof may be equal to one from 0 to 335. According to one value used among the above-described values, a synchronization source may also be identified. For example, values of 0, 168, and 169 may indicate global navigation satellite systems (GNSS), values from 1 to 167 may indicate base stations, and values from 170 to 335 may indicate being out of coverage. Alternatively, among the physical layer sidelink synchronization ID values, values 0 to 167 may be values being used by a network, and values from 168 to 335 may be values used outside network coverage.

Figure 13:
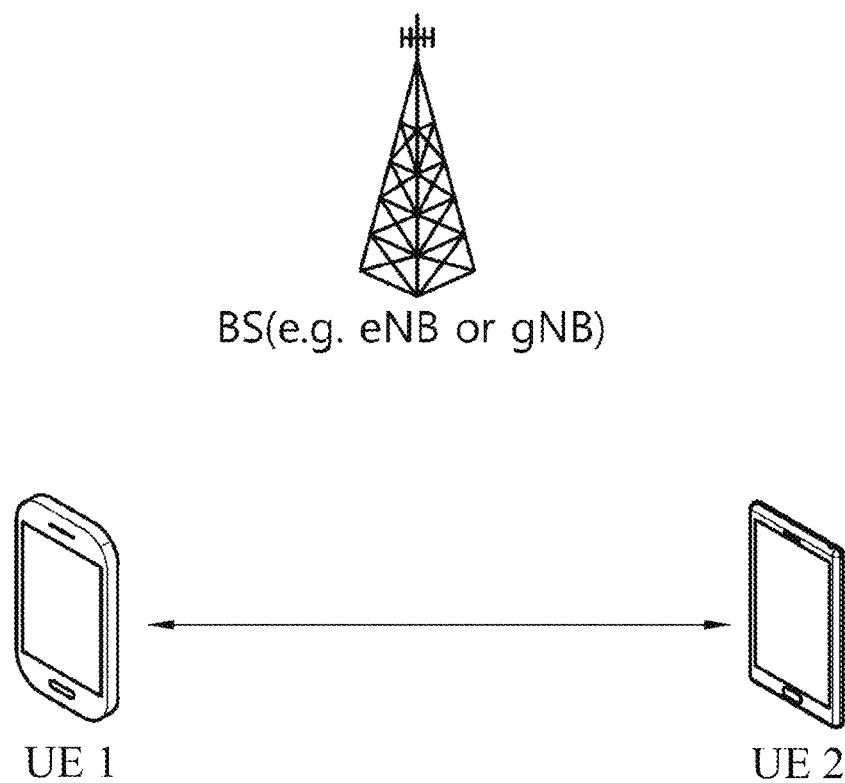
FIG. 13 illustrates an example of a UE and a base station for performing V2X or SL communication.

FIG. 13 illustrates an example of a UE and a base station for performing V2X or SL communication.

Referring to FIG. 13, the term "UE" in V2X/SL communication may mainly refer to an equipment of a user. However, when a network equipment such as a base station transmits or receives a signal according to a communication scheme between the network equipment and the UE, the base station may also be considered as a type of UE.

UE 1 may select a resource unit corresponding to a specific resource within a resource pool that means a set of resources, and operate to transmit an SL signal by using the corresponding resource unit. UE 2 corresponding to a reception UE may receive a configuration of a resource pool in which UE 1 can transmit a signal, and may detect a signal of UE 1 within the corresponding resource pool.

Here, when UE 1 is within a connection range of the base station, the base station may notify of a resource pool. On the other hand, when UE 1 is outside the connection range of the base station, another UE may notify of the resource pool or the resource pool may be determined as a predetermined resource.

Figure 14:
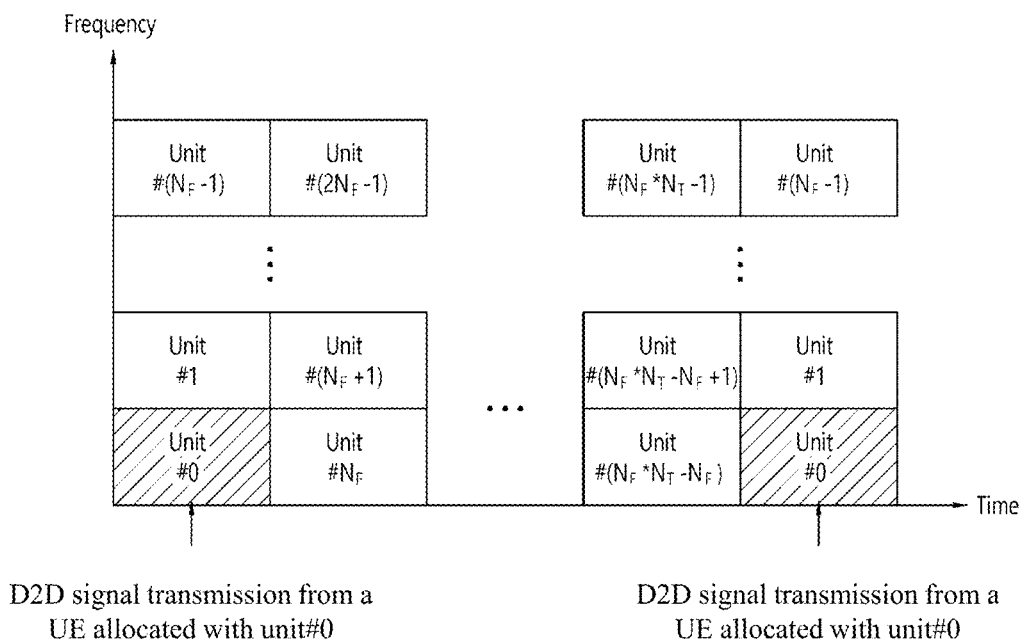
FIG. 14 illustrates an example of a resource unit for V2X or SL communication.

FIG. 14 illustrates an example of a resource unit for V2X or SL communication.

Referring to FIG. 14, a resource pool may include multiple resource units, and each UE may select one or multiple resource units and use the same for SL signal transmission. A total of frequency resources of the resource pool may be divided into $N_F$ number of resource units, and a total of time resources of the resource pool may be divided into $N_T$ number of resource units. Accordingly, a total of $N_F*N_T$ number of resource units may be defined in the resource pool.

As shown in FIG. 14, one resource unit (e.g., Unit #0) may be periodically and repeatedly indicated. Alternatively, in order to achieve a diversity effect in the time or frequency dimension, an index of a physical resource unit to which a logical resource unit is mapped may be changed to a pre-determined pattern in accordance with time. In such a resource-unit structure, the resource pool may refer to a set of resource units that can be used for a transmission that is performed by the UE which is to transmit the SL signal.

The resource pool may be segmented to multiple types. For example, according to the content of an SL signal transmitted in each resource pool, the resource pool may be divided as below.

(1) Scheduling assignment (SA) may be a signal including information such as a position of a resource that a transmission UE uses to transmit an SL data channel, a modulation and coding scheme (MCS) or a multiple input multiple output (MIMO) transmission scheme needed for the modulation of other data channels, and a timing advance (TA). The SA may also be multiplexed with SL data within the same resource unit and may then be transmitted, and in this case, an SA resource pool may refer to a resource pool in which the SA is multiplexed with the SL data and then transmitted. The SA may also be referred to as a SL control channel.

(2) A physical sidelink shared channel (PSSCH) may be a resource pool that a transmission UE uses to transmit user data. If the SA is multiplexed with SL data within the same resource unit and then transmitted, only a sidelink data channel obtained by excluding SA information may be transmitted in the resource pool for sidelink data channel. In other words, resource elements (REs) used to transmit SA information on an individual resource unit within the SA resource pool may still be used to transmit SL data in the resource pool of the SL data channel.

Hereinafter, resource allocation in the SL is described.

Figure 15:
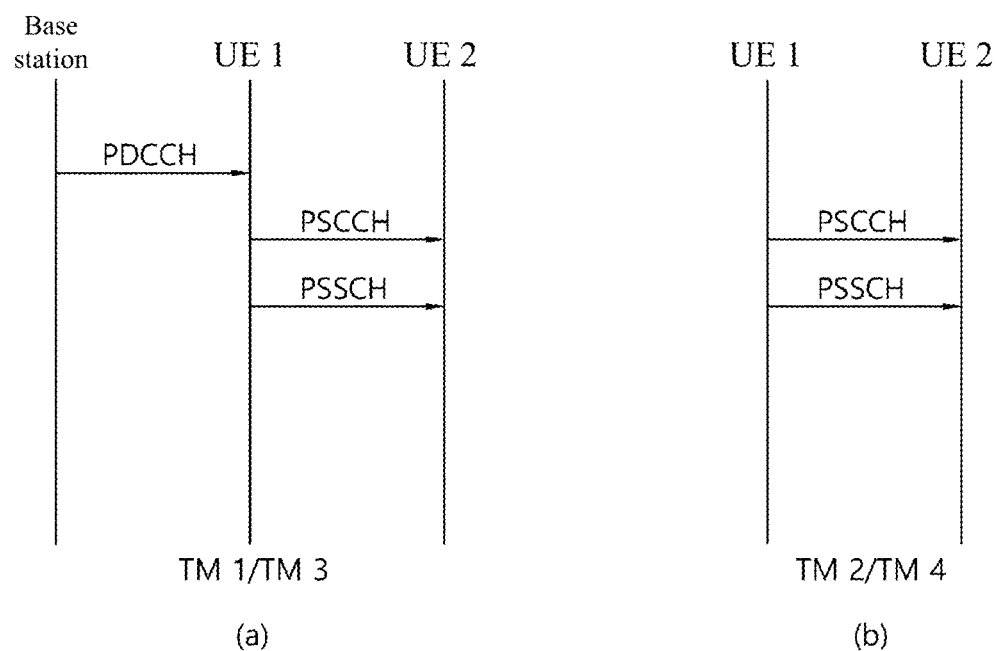
FIG. 15 illustrates an example of a procedure of performing V2X or SL communication of a UE according to a transmission mode.

FIG. 15 illustrates an example of a procedure of performing V2X or SL communication of a UE according to a transmission mode.

Referring to FIG. 15, FIG. 15(a) illustrates a UE operation related to transmission mode 1 or transmission mode 3, and FIG. 15(b) illustrates a UE operation related to transmission mode 2 or transmission mode 4.

Referring to FIG. 15(a), in transmission mode 1 or 3, the base station performs resource scheduling for UE 1 via a PDCCH (more specifically, downlink control information (DCI)), and UE 1 performs SL/V2X communication with UE 2 according to the corresponding resource scheduling. After transmitting sidelink control information (SCI) to UE 2 via a physical sidelink control channel (PSCCH), UE 1 may transmit data based on the SCI via a physical sidelink shared channel (PSSCH). In case of an LTE SL, transmission mode 1 may be applied to general sidelink communication, and transmission mode 3 may be applied to V2X sidelink communication.

Referring to FIG. 15(b), in transmission mode 2 or 4, the UE may schedule resources on its own. More specifically, in a case of an LTE SL, transmission mode 2 may be applied to general sidelink communication, and the UE may select a resource from a configured resource pool on its own and may then perform an SL operation. Transmission mode 4 may be applied to V2X sidelink communication, and the UE may carry out a sensing/SA decoding process, etc., select a resource within a selection window on its own, and then then perform a V2X sidelink operation. After transmitting the SCI to UE 2 via a PSCCH, UE 1 may transmit SCI-based data via a PSSCH. Hereinafter, the transmission mode may be abbreviated to a "mode". Procedures related to sensing and resource (re)selection may be supported in resource allocation mode 2. The sensing procedure may be defined as decoding the SCI from another UE and/or SL measurement. The decoding of the SCI in the sensing procedure may at least provide information on an SL resource indicated by a UE transmitting the SCI. When the corresponding SCI is decoded, the sensing procedure may use L1 SL reference signal received power (RSRP) measurement, which is based on an SL demodulation reference signal (DMRS). The resource (re)selection procedure may use a result of the sensing procedure in order to determine the resource for the SL transmission.

Figure 16:
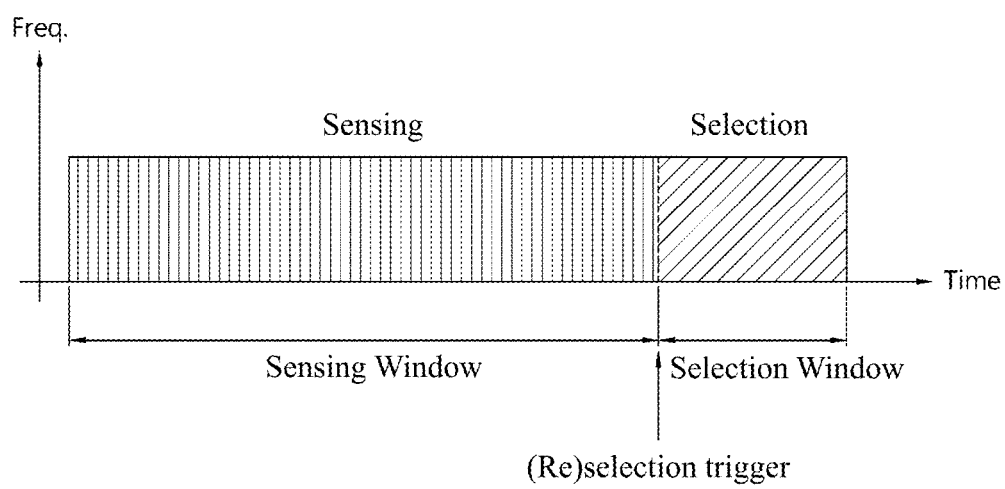
FIG. 16 illustrates an example of a method of selecting a transmission resource for transmitting a signal by a UE.

FIG. 16 illustrates an example of a method of selecting a transmission resource for transmitting a signal by a UE.

Referring to FIG. 16, the UE may identify transmission resources reserved by another UE or resources used by another UE via sensing within a sensing window, and after excluding the identified resources from a selection window, the UE may randomly select a resource from resources having low interference among the remaining resources.

For example, within the sensing window, the UE may decode the PSCCH including information on the cycles of the reserved resources, and then measure PSSCH RSRP from resources that are periodically determined based on the PSCCH. The UE may exclude resources having the PSSCH RSRP value exceeding a threshold value from the selection window. Thereafter, the UE may randomly select an SL resource from the remaining resources within the selection window.

Figure 17:
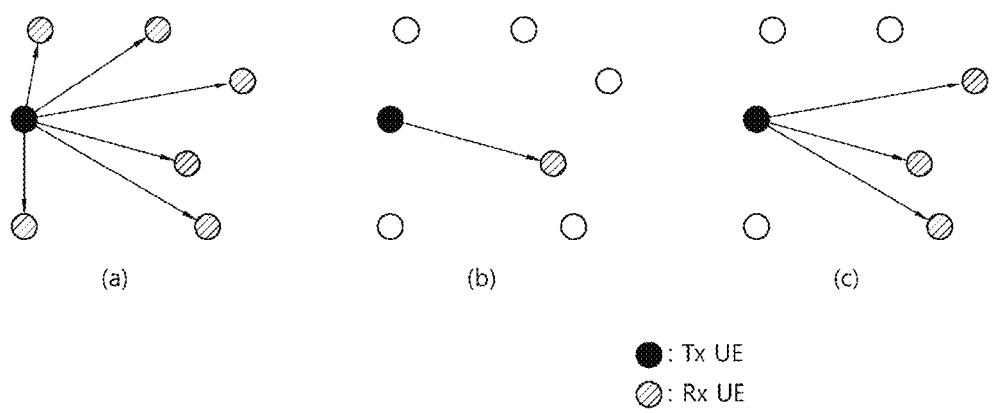
FIG. 17 illustrates an example of three cast types of an NR sidelink.

FIG. 17 illustrates an example of three cast types of an NR sidelink.

Referring to FIG. 17, an NR sidelink supports three cast types corresponding to unicast, groupcast, and broadcast. In a case of unicast-type SL communication, the UE may perform one-to-one communication with another UE. In a case of groupcast-type SL communication, the UE may perform SL communication with one or more UEs in a group to which the UE belongs. The groupcast-type SL communication may be substituted by SL multicast communication, SL one-to-many communication, etc.

Hereinafter, a hybrid automatic repeat request (HARQ) procedure in SL is described.

In the case of the SL unicast and groupcast, HARQ feedback and HARQ combining in a physical layer may be supported. For example, when a reception UE operates in resource allocation mode 1 or 2, the reception UE may receive a PSSCH from a transmission UE, and the reception UE may transmit HARQ feedback for the PSSCH to the transmission UE through a physical sidelink feedback channel (PSFCH) by using a sidelink feedback control information (SFCI) format.

For example, the SL HARQ feedback may be enabled for the groupcast. That is, in a non-CBG operation, two HARQ feedback options may be supported for the groupcast.

(1) Groupcast option 1: When a reception UE decodes a PSCCH targeted for the reception UE and then the reception UE fails to decode a transport block related to the PSCCH, the reception UE may transmit HARQ-NACK to the transmission UE through a PSFCH. On the other hand, when the reception UE decodes a PSCCH targeted for the reception UE and the reception UE successfully decodes a transport block related to the PSCCH, the reception UE may not transmit HARQ-ACK to a transmission UE.

(2) Groupcast option 2: When a reception UE decodes a PSCCH targeted for the reception UE and then the reception UE fails to decode a transport block related to the PSCCH, the reception UE may transmit HARQ-NACK to a transmission UE through a PSFCH. In addition, when a reception UE decodes a PSCCH targeted for the reception UE and the reception UE successfully decodes a transport block related to the PSCCH, the reception UE may transmit HARQ-ACK to a transmission UE through a PSFCH.

Meanwhile, for example, in a case of SL communication related to a service having requirements of high reliability or a service having requirements of relatively high reliability, an SL HARQ feedback operation and/or mechanism of the UE may be useful. For example, in a case of SL communication related to a service having requirements of high reliability, an operation in which a UE having received the service transmits SL HARQ feedback to a UE having transmitted the service may be useful in satisfying the requirements of high reliability.

An HARQ feedback resource may include an HARQ feedback transmission resource and/or an HARQ feedback reception resource. For example, the HARQ feedback transmission resource may include a resource for transmitting HARQ feedback and/or a resource related to the transmission of HARQ feedback. For example, the HARQ feedback reception resource may include a resource for receiving HARQ feedback and/or a resource related to the reception of HARQ feedback.

A PSSCH resource may include a PSSCH transmission resource and/or a PSSCH reception resource. For example, the PSSCH transmission resource may include a resource for transmitting a PSSCH and/or a resource related to the transmission of the PSSCH. For example, the PSSCH reception resource may include a resource for receiving a PSSCH and/or a resource related to the reception of the PSSCH.

A PSCCH resource may include a PSCCH transmission resource and/or a PSCCH reception resource. For example, the PSCCH transmission resource may include a resource for transmitting a PSCCH and/or a resource related to the transmission of the PSCCH. For example, the PSCCH reception resource may include a resource for receiving a PSCCH and/or a resource related to the reception of the PSCCH.

The resource may include at least one of a time domain resource, a frequency domain resource, and/or a code domain resource.

When a resource collision occurs during at least one of a PSSCH transmission, a PSCCH transmission, and/or an HARQ feedback transmission of the UE, it may be difficult for the SL HARQ feedback procedure and/or operation of the UE to be correctly executed. For example, when a resource collision occurs during at least one of a PSSCH transmission, a PSCCH transmission, and/or an HARQ feedback transmission, it may be difficult for the overall SL HARQ feedback procedure and/or operation of the UE to be accurately executed.

Although the reception UE has successfully received the PSSCH, when an error occurs in the HARQ feedback (e.g., HARQ ACK) due to the resource collision, the transmission UE may need to unnecessarily retransmit the PSSCH to the reception UE. For example, when the reception UE fails to receive the PSSCH and the HARQ feedback fails to be transmitted to the transmission UE due to the resource collision, the SL communication-related reliability or capability (or performance) may be degraded. For example, when the reception UE fails to receive the PSCCH and/or the PSSCH transmitted from the transmission UE and when an HARQ NACK corresponding to the PSCCH and/or the PSSCH fails to be correctly delivered to the transmission UE due to the resource collision, the SL communication-related reliability or performance may be degraded. Therefore, the HARQ feedback resource may need to be determined so that the collision between the plurality of UEs are prevented or minimized.

A transmission UE may transmit a PSCCH and/or a PSSCH to a reception UE. For example, the transmission UE may transmit SL information to the reception UE by using a PSCCH resource and/or a PSSCH resource. For example, the SL information may include at least one of SL control information, SL data, an SL packet, an SL transport block (TB), an SL message, and/or an SL service.

The reception UE may determine an HARQ feedback resource. Additionally, for example, the transmission UE may determine the HARQ feedback resource.

The HARQ feedback resource may be configured to have a correlation or linkage with the PSSCH. For example, the HARQ feedback resource may include at least one of a time domain resource, a frequency domain resource, and/or a code domain resource. For example, a position of the HARQ feedback resource may be configured to have a correlation or linkage with a linked PSSCH resource. For example, a position of the HARQ feedback resource may be configured to have a correlation or linkage with a linked PSSCH resource, based on a pre-defined function. For example, the HARQ feedback resource may be determined based on at least one of information on a time domain related to the PSSCH, information on a frequency domain related to the PSSCH, and/or information on a code domain related to the PSSCH.

For example, the HARQ feedback resource may be configured to have a correlation or linkage with the PSCCH. For example, a position of the HARQ feedback resource may be configured to have a correlation or linkage with a linked PSCCH resource. For example, a position of the HARQ feedback resource may be configured to have a correlation or linkage with a position of a linked PSCCH resource, based on a pre-defined function. For example, the HARQ feedback resource may be determined based on at least one of information on a time domain related to the PSCCH, information on a frequency domain related to the PSCCH, and/or information on a code domain related to the PSCCH.

The HARQ feedback resource may be configured in the form of a subset of a frequency resource used for PSSCH transmission and/or PSCCH transmission. For example, the frequency domain of the HARQ feedback resource may be configured in the form of a subset of a frequency domain of a linked PSSCH resource and/or PSCCH resource. For example, the frequency domain of the HARQ feedback resource may be included in the frequency domain of a PSSCH resource and/or a PSCCH resource.

Figure 18:
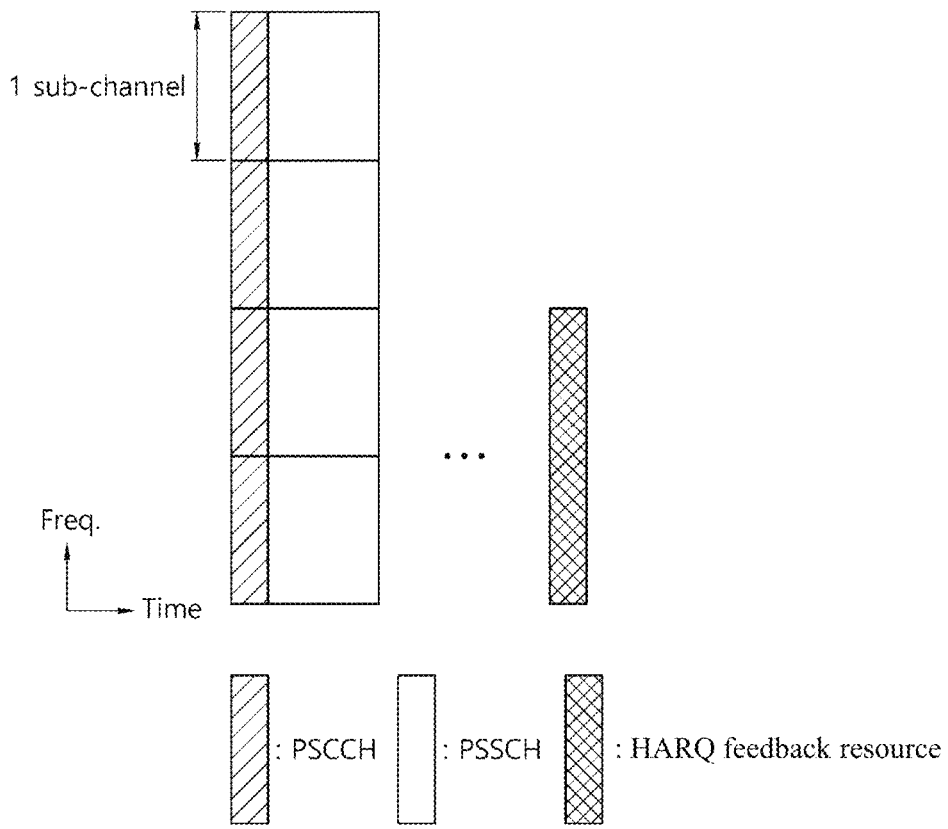
FIG. 18 illustrates an example of a resource for transmitting HARQ feedback in an NR sidelink.

FIG. 18 illustrates an example of a resource for transmitting HARQ feedback in an NR sidelink.

Referring to FIG. 18, a transmission UE may transmit a PSCCH and/or a PSSCH to a reception UE via four subchannels. In this case, the frequency domain of an HARQ feedback resource related to the PSCCH and/or PSSCH may correspond to a subset of the frequency resource used by the transmission UE to transmit a PSCCH and/or a PSSCH.

A time gap between an HARQ feedback resource and a PSSCH resource may be configured. For example, a time gap between an HARQ feedback resource and a PSCCH resource may be configured. For example, in consideration of the decoding capability and/or latency requirements (e.g., V2X message and/or service related latency requirements) of the UE, a time gap may be configured between a PSCCH and/or PSSCH reception point of a reception UE and an HARQ feedback transmission point of the reception UE. For example, in consideration of the decoding capability and/or latency requirements of the UE, a time gap may be configured between an HARQ feedback reception point of a transmission UE and a PSSCH and/or PSCCH (re)transmission point of the transmission UE.

The time gap may be commonly configured in a resource pool. For example, the time gap may be commonly configured between different UEs within a resource pool. For example, the time gap may be commonly configured to the transmission UE and the reception UE. Therefore, the UE may simply determine the HARQ feedback. For example, the time gap may be configured specifically for a resource pool.

Among a latency budget of services co-existing in a resource pool, the time gap may be configured or designated to have a value less than and/or equal to the smallest latency budget value. For example, when service A and service B co-exist in the resource pool and when the latency budget of service A is smaller than the latency budget of service B, the time gap may be configured or designated to have a value that is smaller than or equal to that of the latency budget of service A.

The time gap may be designated so that a maximum number of retransmissions related to a transport block (TB), which is specifically configured according to a resource pool, a service type, a service priority, a cast type, and/or QoS requirements of the service, can all be supported/performed in a latency budget for a (related) service in the resource pool. For example, the maximum number of retransmissions may be a maximum allowable number of retransmissions including an initial transmission.

Among the decoding capabilities of the UE, the time gap may be configured or designated to have a value greater than and/or equal to the greatest decoding capability value. Here, for example, the decoding capability may be a processing time of the UE, which is needed from a PSSCH reception termination/end time of the UE to a PSFCH transmission start time of the UE. For example, the decoding capability may be a processing time of the UE, which is needed from a PSCCH reception termination/end time of the UE to a PSFCH transmission start time of the UE. For example, among the decoding capabilities of the UE within a resource pool, the time gap may be configured or designated to have a value greater than and/or equal to the greatest decoding capability value. For example, when UE A, UE B, and UE C perform SL communication within the resource pool and when the decoding capability of UE A is the least favorable, the time gap may be configured or designated to have a value greater than and/or equal to the processing time that is required from a PSSCH and/or PSCCH reception termination/end time point of UE A to a PSFCH transmission start time point of UE A.

The time gap may be differently or independently configured for each service type, service priority, SL communication type, session related to the service, PPPP related to the service, PPPR related to the service, block error rate (BLER) related to the service, signal to interference plus noise ratio (SINR) related to the service, latency budget related to the service, and/or UE capability. For example, the time gap may be differently or independently configured for each service type, service priority, SL communication type, session related to the service, PPPP related to the service, PPPR related to the service, BLER related to the service, SINR related to the service, latency budget related to the service, and/or UE capability within the resource pool. For example, the SL communication type may include at least one of unicast, groupcast, and/or broadcast.

The reception UE may transmit HARQ feedback to the transmission UE. For example, the reception UE may transmit HARQ feedback corresponding to the PSCCH and/or PSSCH to the transmission UE. For example, the reception UE may transmit the HARQ feedback to the transmission UE by using an HARQ feedback resource, which is determined based on the PSCCH resource and/or the PSSCH resource. For example, the transmission UE may receive HARQ feedback from the reception UE within an HARQ feedback resource, which is determined based on the PSCCH resource and/or the PSSCH resource.

When the reception UE successfully receives the PSCCH and/or the PSSCH, the HARQ feedback may be an HARQ ACK. For example, when the reception UE fails to receive the PSCCH and/or the PSSCH, the HARQ feedback may correspond to at least one of an HARQ NACK and/or discontinuous detection (DTX).

In a case of groupcast in which multiple UEs within a group perform SL communication with one another, the HARQ feedback resource may be implemented as two different types.

(1) Option A: A common HARQ feedback resource may be configured between reception UEs. For example, when a transmission UE transmits a PSSCH and/or a PSCCH to multiple reception UEs, the HARQ feedback resource may be commonly configured for the multiple reception UEs that have received the PSSCH and/or the PSCCH.

(2) Option B: HARQ feedback resources being different or independent from one another may be configured between reception UEs. For example, HARQ feedback resources being different or independent from one another may be configured for each reception UE or sub-group including one or more reception UEs. For example, when a transmission UE transmits a PSSCH and/or a PSCCH to multiple reception UEs, HARQ feedback resources being different or independent from one another may each be configured for multiple sub-groups or multiple reception UEs that have received the PSSCH and/or the PSCCH.

Option A may be limitedly applied only to groupcast option 1. For example, in groupcast option 1, multiple reception UEs may transmit an HARQ NACK to the transmission UE by using an HARQ feedback resource, which is commonly configured for the multiple reception UEs, only when the multiple reception UEs fail to receive the PSSCH and/or PSCCH. For example, the HARQ NACK may be implemented in the form of a single frequency network (SFN). In this case, the transmission UE may not be capable of separating and receiving the HARQ NACKs transmitted by the multiple reception UEs. Therefore, the transmission UE may not be able to know a reception UE which has transmitted the HARQ NACK. However, the transmission UE may know that at least one reception UE among the multiple reception UEs has transmitted the HARQ NACK, and the transmission UE may retransmit the PSSCH and/or the PSCCH to the multiple reception UEs.

In a case of option A, a unicast-related HARQ feedback resource structure may be re-used. For example, in a case of option A, overhead related to the HARQ feedback resource may be decreased. Conversely, in a case of option A, there may be limitations that the transmission UE cannot determine/recognize a DTX. For example, when the transmission UE has transmitted the PSSCH and/or the PSCCH to the reception UE, the reception UE may fail to receive a PSCCH, which schedules the PSSCH. In this case, according to option A, the reception UE may not transmit the HARQ NACK to the transmission UE. Therefore, there may occur a problem where the transmission UE misinterprets that the reception UE has successfully received the PSSCH.

In a case of option B, within a group including multiple reception UEs, HARQ feedback resources being different or independent from one another may be allocated for each reception UE or sub-group. Here, for example, according to option B, as the number of reception UEs or the number of sub-groups included in the group becomes larger, a larger amount of HARQ feedback resources may be required. For example, in a case of a group including N number of reception UEs, (N–1) number of HARQ feedback resources may be required. For example, option B may be limitedly applied only to groupcast option 2.

Figure 19:
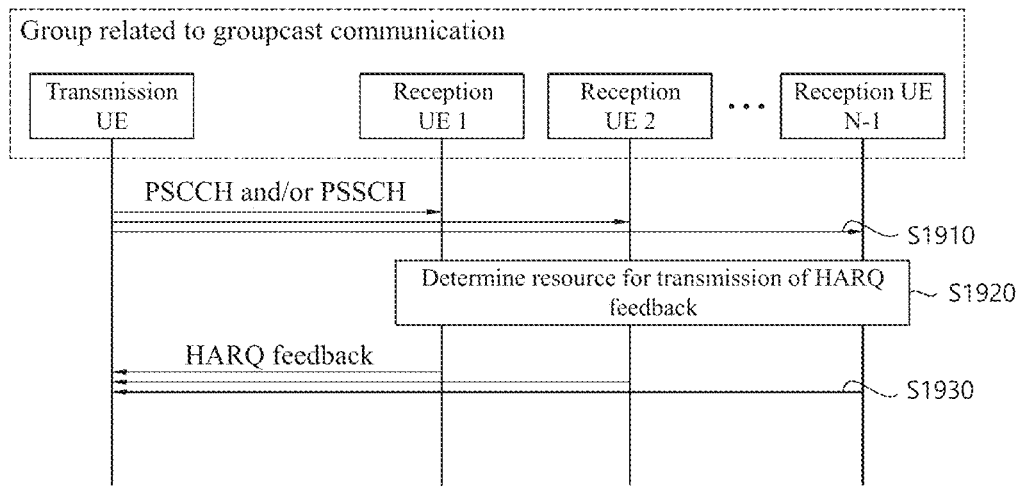
FIG. 19 illustrates an example of a procedure of transmitting or receiving HARQ feedback by a UE in groupcast SL communication.

FIG. 19 illustrates an example of a procedure of transmitting or receiving HARQ feedback by a UE in groupcast SL communication.

In FIG. 19, it is assumed that N number of UEs are included in a group. For example, the group may correspond to a group related to groupcast SL communication. For example, the embodiment of FIG. 19 may be applied with respect to option B. For example, the embodiment of FIG. 19 may be applied with respect to groupcast option 2.

Referring to FIG. 19, a transmission UE may transmit a PSCCH and/or a PSSCH to multiple reception UEs in a group (S1910). For example, the transmission UE may transmit SL information to the multiple reception UEs in the group by using a PSCCH resource and/or a PSSCH resource. For example, the SL information may include at least one of SL control information, SL data, an SL packet, an SL transport block (TB), an SL message, and/or an SL service The multiple reception UEs having received the PSCCH and/or the PSSCH may determine an HARQ feedback resource (S1920). Additionally, for example, the transmission UE may determine the HARQ feedback resource.

When the group is generated, an identifier (hereinafter, GUE_ID) used within the group may be allocated for each UE. For example, when the group is generated, a GUE_ID may be allocated for each sub-group. For example, the GUE_ID may be generated by a specific UE and may then be delivered to the UEs within the group. For example, the specific UE may be a group owner (GO). For example, the GUE_ID may be configured by the network or base station, or may be configured in advance. For example, the GUE_ID may be differently allocated for the multiple UEs within the group. For example, the GUE_ID may be differently allocated for the multiple sub-groups within the group.

The multiple reception UEs may each determine an HARQ feedback resource, based on its GUE_ID. For example, reception UE 1 may determine the HARQ feedback resource by using the GUE_ID that is allocated to reception UE 1, reception UE 2 may determine the HARQ feedback resource by using the GUE_ID that is allocated to reception UE 2, and reception UE (N−1) may determine the HARQ feedback resource by using the GUE_ID that is allocated to reception UE (N−1). Therefore, the HARQ feedback resource may be differently determined for each of the multiple reception UEs within the group.

UEs (e.g., reception UEs) remaining after excluding the transmission UE may sequentially use the multiple HARQ feedback resources (e.g., (N−1) number of HARQ feedback resources, where N indicates the number of UEs in the group) in accordance with an ascending order of the GUE_ID. For example, UEs (e.g., reception UEs) remaining after excluding the transmission UE may sequentially use the multiple HARQ feedback resources (e.g., (N−1) number of HARQ feedback resources) in accordance with a descending order of the GUE_ID. For example, UEs (e.g., reception UEs) remaining after excluding the transmission UE may sequentially use the multiple HARQ feedback resources (e.g., (N−1) number of HARQ feedback resources) in accordance with an order of the GUE_ID that is derived based on a pre-configured function/rule. For example, the multiple HARQ feedback resources may be configured in advance. For example, the transmission UE may correspond to a UE that has transmitted the PSSCH and/or the PSCCH to the multiple reception UEs.

Sub-groups remaining after excluding the transmission UE may sequentially use the multiple HARQ feedback resources in accordance with an ascending order of the GUE_ID. For example, sub-groups remaining after excluding the transmission UE may sequentially use the multiple HARQ feedback resources in accordance with a descending order of the GUE_ID. For example, sub-groups remaining after excluding the transmission UE may sequentially use the multiple HARQ feedback resources in accordance with an order of the GUE_ID that is derived based on a pre-configured function/rule. For example, the multiple HARQ feedback resources may be configured in advance. For example, the transmission UE may correspond to a UE that has transmitted the PSSCH and/or the PSCCH to the multiple reception UEs.

Thereafter, each of the multiple UEs may transmit HARQ feedback to the transmission UE by using the determined HARQ feedback resource (S1930).

Figure 20:
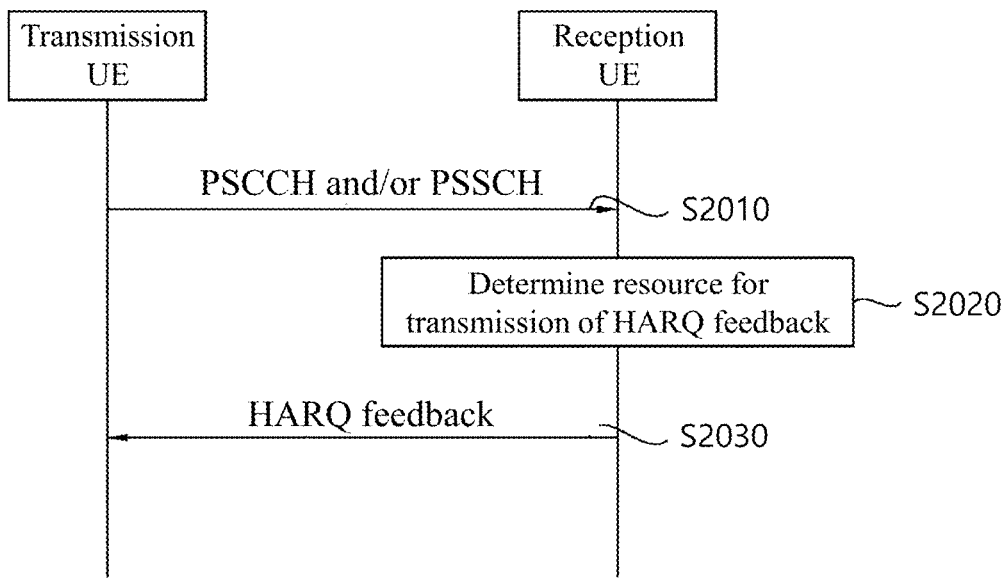
FIG. 20 illustrates an example of a procedure of transmitting or receiving HARQ feedback for a PSCCH and/or a PSSCH.

FIG. 20 illustrates an example of a procedure of transmitting or receiving HARQ feedback for a PSCCH and/or a PSSCH.

Referring to FIG. 20, multiple reception UEs may each transmit HARQ feedback to a transmission UE. For example, the multiple reception UEs may each transmit HARQ feedback corresponding to the PSCCH and/or the PSSCH to the transmission UE. The multiple reception UEs may each transmit the HARQ feedback to the transmission UE by using an HARQ feedback resource, which is determined based on the PSCCH resource and/or the PSSCH resource.

When the reception UE successfully receives the PSCCH and/or the PSSCH, the HARQ feedback may be an HARQ ACK. For example, when the reception UE fails to receive the PSCCH and/or the PSSCH, the HARQ feedback may be at least one of an HARQ NACK and/or discontinuous detection (DTX).

The UE may determine HARQ feedback transmission power based on at least one of an SL pathloss value derived/acquired based on a reference signal on an SL channel, an SL RSRP value derived/acquired based on a reference signal on the SL channel, an SL RSRQ value derived/acquired based on a reference signal on the SL channel, an open-loop power control parameter, and/or a closed-loop power control parameter. For example, when the transmission UE transmits a reference signal to the reception UE via an SL channel, the reception UE may determine HARQ feedback transmission power based on at least one of an SL pathloss value derived/acquired based on a reference signal on an SL channel, an SL RSRP value derived/acquired based on a reference signal on the SL channel, an SL RSRQ value derived/acquired based on a reference signal on the SL channel, an open-loop power control parameter, and/or a closed-loop power control parameter.

The reference signal on the SL channel may be defined in advance. The reference signal on the SL channel may be a DMRS transmitted on the PSSCH (i.e., PSSCH DMRS) or a DMRS transmitted on the PSCCH (i.e., PSCCH DMRS). The reference signal on the SL channel may be a CSI-RS transmitted on a PSSCH. The reference signal on the SL channel may be a reference signal used for quality estimation (e.g., CQI, PMI, or RI) of the SL channel. For example, the reference signal on the SL channel may be a reference signal used for the measurement of at least one of an SL pathloss value, an SL RSRP value, and/or an SL RSRQ value.

The SL pathloss may be a pathloss corresponding to a link between a transmission UE and a reception UE. For example, the open-loop power control parameter and/or the closed-loop power control parameter may be configured in advance. For example, the open-loop power control parameter may include a Po and/or an alpha value.

Po may be a power control parameter for averagely satisfying a target error rate (e.g., block error rate (BLER) or frame error rate (FER)) related to packet/message transmission. For example, Po may be a power control parameter related to an average reception SINR between a transmission UE and a reception UE. For example, Po may be a power control parameter that is specified to a UE, a resource pool, a service type, a service priority level, QoS requirements related to a service, a (frequency) resource size being used for SL transmission, an MCS value being used for SL transmission, a congestion level (e.g., CBR) related to the resource pool, and/or a cast type. For example, when the HARQ feedback transmission power is calculated/derived based on an SL RSRP and/or SL RSRQ value/range, different Po values/ranges may be mapped/configured for each (pre-configured) SL RSRP and/or SL RSRQ value/range.

When the HARQ feedback transmission power is calculated/derived based on an SL pathloss, an alpha value may be a weighted value applied to (measured) pathloss compensation. When the HARQ feedback transmission power is calculated/derived based on an SL RSRP and/or SL RSRQ value/range, an alpha value may be a weighted value applied to a (measured) SL RSRP and/or SL RSRQ value/range. When the HARQ feedback transmission power is calculated/derived based on an SL RSRP and/or SL RSRQ value/range, an alpha value may be a weighted value applied to HARQ feedback transmission power mapped/configured for each (measured) SL RSRP and/or SL RSRQ value/range. Here, an alpha value/range may be specifically configured for a UE, a resource pool, a service type, a service priority level, QoS requirements related to a service, a (frequency) resource size being used for SL transmission, an MCS value being used for SL transmission, a congestion level (e.g., CBR) related to the resource pool, and/or a cast type. When the HARQ feedback transmission power is calculated/derived based on an SL RSRP and/or SL RSRQ value/range, different alpha values/ranges may be mapped/configured for each (pre-configured) SL RSRP and/or SL RSRQ value/range.

When the HARQ feedback transmission power is calculated/derived based on an SL RSRP and/or SL RSRQ value/range, different offset values/ranges may be mapped/configured for each (pre-configured) SL RSRP and/or SL RSRQ value/range. A UE that has measured the SL RSRP and/or SL RSRQ may apply the offset related to the SL RSRP value and/or SL RSRQ value to (pre-configured normalized or nominal) (maximum) SL (HARQ feedback) transmission power, so as to determine final HARQ feedback transmission power. Here, for example, the offset value/range may be specifically configured for a UE, a resource pool, a service type, a service priority, QoS requirements related to a service, a (frequency) resource size used for SL transmission, an MCS value used for SL transmission, a congestion level (e.g., CBR) related to the resource pool, and/or a cast type.

Different (normalized or nominal) (maximum) SL HARQ feedback transmission power values/ranges may be mapped/configured for each (pre-configured) SL RSRP and/or SL RSRQ value/range. For example, a (normalized or nominal) (maximum) SL HARQ feedback transmission power value/range may be specifically configured for a UE, a resource pool, a service type, a service priority, QoS requirements related to a service, a (frequency) resource size used for SL transmission, an MCS value used for SL transmission, a congestion level (e.g., CBR) related to the resource pool, and/or a cast type.

The reference signal and/or the transmission power value related to an SL channel including the reference signal may be signaled to a UE via a pre-defined channel. The transmission UE may transmit the reference signal and/or the transmission power value related to an SL channel including the reference signal to the reception UE via a pre-defined channel. The pre-defined channel may correspond to a PSSCH. The reception UE may correspond to a UE measuring at least one of an SL pathloss, SL RSRP, and/or an SL RSRQ based on the reference signal.

The open-loop power control parameter (and/or (maximum or minimum) HARQ feedback transmission power value mapped/configured for each SL RSRP (and/or SL RSRQ) value/range) may be differently or independently configured for each service type, service priority, SL communication type (e.g., unicast, groupcast, or broadcast), (resource pool related) congestion level (e.g., Channel Busy Ratio (CBR)), session related to the service, PPPP related to the service, PPPR related to the service, block error rate (BLER) related to the service, target signal to interference plus noise ratio (SINR) related to the service, (minimum or maximum) target communication distance related to the service, and/or latency budget related to the service. For example, a closed-loop transmission power control operation/parameter may be differently or independently operated/configured for each service type, service priority, SL communication type (e.g., unicast, groupcast, or broadcast), (resource pool related) congestion level (e.g., CBR), session related to the service, PPPP related to the service, PPPR related to the service, block error rate (BLER) related to the service, target signal to interference plus noise ratio (SINR) related to the service, (minimum or maximum) target communication distance related to the service, and/or latency budget related to the service.

An open-loop transmission power control parameter related to the HARQ feedback may be differently or independently configured from the open-loop transmission power control parameter related to the PSSCH and/or the PSCCH. A closed-loop transmission power control operation/parameter related to the HARQ feedback may be differently or independently operated/configured from the closed-loop transmission power control operation/parameter related to the PSSCH and/or the PSCCH.

FDM of an HARQ resource may be allowed or configured only for reception UEs having a distance from the transmission UE receiving the HARQ feedback within a pre-determined threshold value. FDM of an HARQ resource may be allowed or configured only for reception UEs having an SL pathloss difference for a link between the transmission UE and the reception UE within a predetermined threshold value. FDM of an HARQ resource may be allowed or configured only for reception UEs having an SL RSRP difference for a link between the transmission UE and the reception UE within a predetermined threshold value. FDM of an HARQ resource may be allowed or configured only for reception UEs having an SL RSRQ difference for a link between the transmission UE and the reception UE within a predetermined threshold value.

If a distance between each of the multiple reception UEs and the transmission UE is within a pre-configured threshold value, the multiple reception UEs may transmit HARQ feedback via a resource multiplexed using FDM on the frequency axis. If a pathloss difference between each of the multiple reception UEs and the transmission UE is within a pre-configured threshold value, the multiple reception UEs may transmit HARQ feedback via a resource multiplexed using FDM on the frequency axis. If a (measured) RSRP value difference between each of the multiple reception UEs and the transmission UE is within a pre-configured threshold value, the multiple reception UEs may transmit HARQ feedback via a resource multiplexed using FDM on the frequency axis. If a (measured) RSRQ value difference between each of the multiple reception UEs and the transmission UE is within a pre-configured threshold value, the multiple reception UEs may transmit HARQ feedback via a resource multiplexed using FDM on the frequency axis.

It may not be preferable to multiplex an HARQ feedback resource by using FDM among UEs or sub-groups within a group. When power control related to HARQ feedback transmission is not applied, it may not be preferable to multiplex an HARQ feedback resource by using FDM among different UEs or different sub-groups within a group. When an HARQ feedback reception power difference among different UEs or different sub-groups within a group is greater than a pre-configured threshold value, it may not be preferable to multiplex an HARQ feedback resource by using FDM among different UEs or different sub-groups within the group. When an SL pathloss difference among different UEs or different sub-groups within a group is greater than a pre-configured threshold value, it may not be preferable to multiplex an HARQ feedback resource by using FDM among different UEs or different sub-groups within the group. When an SL RSRP difference among different UEs or different sub-groups within a group is greater than a pre-configured threshold value, it may not be preferable to multiplex an HARQ feedback resource by using FDM among different UEs or different sub-groups within the group. When an SL RSRQ difference among different UEs or different sub-groups within a group is greater than a pre-determined threshold value, it may not be preferable to multiplex an HARQ feedback resource by using FDM among different UEs or different sub-groups within the group.

As in the above-described example, when it is not preferable to multiplex the HARQ feedback resource by using FDM, the HARQ feedback resource may be pseudo-randomly multiplexed using TDM based on at least one of a GUE_ID, an identifier related to a reception UE, an SL HARQ process ID, and/or an identifier related to a transmission UE. The HARQ feedback resource may be pseudo-randomly determined based on at least one of a GUE_ID, an identifier related to a reception UE, an SL HARQ process ID, and/or an identifier related to a transmission UE. For example, the HARQ feedback resource may be multiplexed using TDM or determined by a function having at least one of a GUE_ID, an identifier related to a reception UE, an SL HARQ process ID, and/or an identifier related to a transmission UE as an input parameter. The HARQ feedback resource may be an HARQ feedback resource for each of the reception UEs within the group. The HARQ feedback resource may be an HARQ feedback resource for each sub-group within the group. For example, the identifier related to the reception UE may correspond to a destination ID. The identifier related to the transmission UE may be a source ID. The function may be defined in advance.

A transmission UE may transmit a PSCCH and/or a PSSCH to a reception UE. The transmission UE may transmit SL information to the reception UE by using a PSCCH resource and/or a PSSCH resource. The SL information may include at least one of SL control information, SL data, an SL packet, an SL transport block (TB), an SL message, and/or an SL service.

The reception UE may determine an HARQ feedback resource. Additionally, the transmission UE may determine the HARQ feedback resource. For example, the reception UE may be one of multiple reception UEs performing groupcast communication within a group.

The HARQ feedback resource may be determined based on at least one of the PSCCH resource, the PSSCH resource, and/or the GUE_ID. When the multiple reception UEs within a group feeds back an HARQ ACK or HARQ NACK to the transmission UE by using different PSFCH resources, the multiple reception UEs within the group may determine the HARQ feedback resource by using the GUE_ID. The resource may include at least one of a time domain resource, a frequency domain resource, and/or a code domain resource. The GUE_ID may correspond to information for identifying a UE within the group.

The reception UE may transmit HARQ feedback to the transmission UE. The reception UE may transmit HARQ feedback corresponding to the PSCCH and/or the PSSCH to the transmission UE. For example, the reception UE may transmit the HARQ feedback to the transmission UE by using an HARQ feedback resource, which is determined based on at least one of the PSCCH resource, the PSSCH resource, and/or the GUE_ID.

When the reception UE successfully receives the PSCCH and/or the PSSCH, the HARQ feedback may be an HARQ ACK. When the reception UE fails to receive the PSCCH and/or the PSSCH, the HARQ feedback may be at least one of an HARQ NACK and/or discontinuous detection (DTX).

When a transmission UE selects a PSSCH and/or PSCCH transmission resource through a sensing operation, a problem of a collision between HARQ feedback transmission-related resources may not occur. When multiple transmission UEs select different PSSCH and/or PSCCH transmission resources through a sensing operation, the HARQ feedback resource may be determined based on a PSSCH resource and/or PSCCH resource. Therefore, among the UEs each having selected different PSSCH and/or PSCCH transmission resources based on the sensing operation, a collision between the HARQ feedback resources may be automatically avoided.

When the transmission UE transmits the same PSSCH and/or PSCCH to multiple reception UEs within the group, the multiple reception UEs may determine an HARQ feedback resource by using different GUE_IDs. Therefore, even though the multiple reception UEs within the group have received the same PSSCH and/or PSCCH, a collision between the HARQ feedback resources may be prevented.

Figure 21:
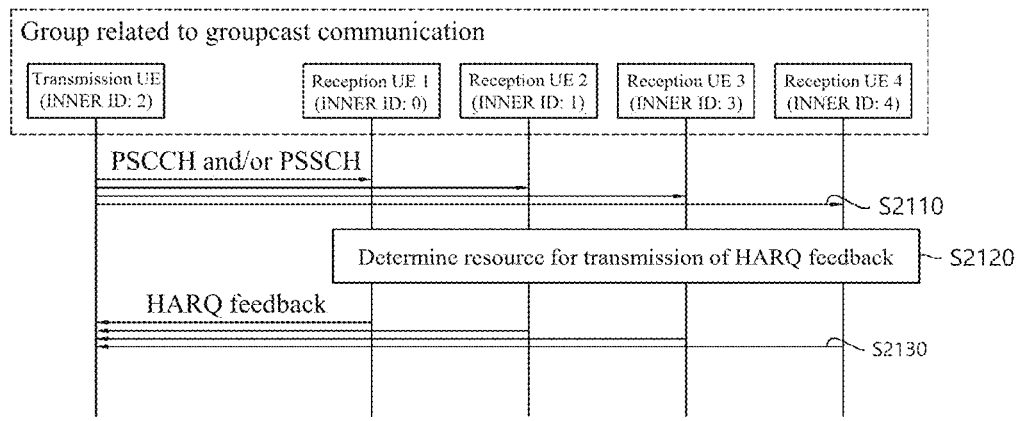
FIG. 21 illustrates an example of a procedure of transmitting or receiving HARQ feedback for a PSCCH and/or a PSSCH in groupcast SL communication.

FIG. 21 illustrates an example of a procedure of transmitting or receiving HARQ feedback for a PSCCH and/or a PSSCH in groupcast SL communication.

Referring to FIG. 21, an ID for identifying a UE within a group may be allocated/designated to multiple UEs within the group. The ID may be referred to as an inner ID. The inner ID may have the same purpose as or may be the same parameter as the GUE_ID. For example, for specific groupcast traffic, an application layer may transfer information on the inner ID of the UE and information on the number of UEs within a group to a V2X layer. The UE may be a UE transmitting the specific groupcast traffic. For specific groupcast traffic, the application layer may not transfer information on an inner ID of another UE within the group to the V2X layer. For example, the groupcast traffic may include at least one of a groupcast service, groupcast data, a groupcast packet, and/or a groupcast message.

When a transmission UE intends to transmit first traffic related to groupcast to multiple reception UEs within a group, an application layer of the transmission UE may transfer information on an inner ID of the transmission UE and information on the number of UEs within the group to a V2X layer of the transmission UE. An application layer of reception UE 1 may transfer information on an inner ID of reception UE 1 and information on the number of UEs within the group to a V2X layer of reception UE 1. An application layer of reception UE 2 may transfer information on an inner ID of reception UE 2 and information on the number of UEs within the group to a V2X layer of reception UE 2. An application layer of reception UE 3 may transfer information on an inner ID of reception UE 3 and information on the number of UEs within the group to a V2X layer of reception UE 3. An application layer of reception UE 4 may transfer information on an inner ID of reception UE 4 and information on the number of UEs within the group to a V2X layer of reception UE 4.

In addition, the V2X layer of the UE may transfer information on an inner ID of the UE and information on the number of UEs within the group to an AS layer of the UE. Additionally, for example, the V2X layer of the UE may transfer an L2 ID (e.g., a source L2 ID or a destination L2 ID), QoS information, and/or the like together to the AS layer of the UE.

A transmission UE may transmit specific groupcast traffic to multiple reception UEs (S2110). The specific groupcast traffic may be transmitted via a PSSCH and/or a PSCCH.

The multiple reception UEs may determine an HARQ feedback resource (S2120). Each of the multiple reception UEs (e.g., an AS layer of each of the multiple reception UEs) may determine the HARQ feedback resource for the specific groupcast traffic, based on information on its inner ID and information on the number of UEs within the group according to a pre-defined rule.

The transmission UE may determine the HARQ feedback resource (that needs to be received by the transmission UE). The transmission UE may derive or determine HARQ feedback resources of the multiple reception UEs related to the specific groupcast traffic, based on information on its inner ID and information on the number of UEs within the group.

When an application layer provides information on the inner ID of the UE and information on the number of UEs within the group to a V2X layer of the UE, the UE may determine or consider one of groupcast option 1 and groupcast option 2 as a (selectable) HARQ feedback option for the specific groupcast traffic. The V2X layer of the UE may determine or consider one of groupcast option 1 and groupcast option 2 as a (selectable) HARQ feedback option for the specific groupcast traffic. Additionally, according to whether a pre-configured condition is satisfied, the UE may finally determine or consider one of groupcast option 1 and groupcast option 2 as an HARQ feedback option for the specific groupcast traffic. When the respective HARQ feedback resources for multiple reception UEs participating in the groupcast are all supported in the resource pool, the UE may finally determine or consider groupcast option 2 as the HARQ feedback option for the specific groupcast traffic. When the respective HARQ feedback resources for multiple UEs participating in the groupcast are not all supported in the resource pool, the UE may finally determine or consider groupcast option 1 as the HARQ feedback option for the specific groupcast traffic. The determination may be performed in the AS layer of the UE.

When the application layer does not provide the information on the number of UEs within the group to the V2X layer of the UE, the UE may determine or consider groupcast option 1 as the HARQ feedback option for the specific groupcast traffic. When the application layer does not provide the information on the inner ID of the UE and/or information on the number of UEs within the group to the V2X layer of the UE, the UE may determine or consider groupcast option 1 as the HARQ feedback option for the specific groupcast traffic. For example, the V2X layer of the UE may determine or consider groupcast option 1 as the HARQ feedback option for the specific groupcast traffic.

When the application layer and/or the V2X layer provides information on the inner ID of the UE and information on the number of UEs within the group to the AS layer of the UE, the UE may determine or consider one of groupcast option 1 and groupcast option 2 as a (selectable) HARQ feedback option for the specific groupcast traffic. The AS layer of the UE may determine or consider one of groupcast option 1 and groupcast option 2 as a (selectable) HARQ feedback option for the specific groupcast traffic. Additionally, according to whether a pre-configured condition is satisfied, the UE may finally determine or consider one of groupcast option 1 and groupcast option 2 as an HARQ feedback option for the specific groupcast traffic. When the respective HARQ feedback resources for multiple UEs participating in the groupcast are all supported in the resource pool, the UE may finally determine or consider groupcast option 2 as the HARQ feedback option for the specific groupcast traffic. When the respective HARQ feedback resources for multiple UEs participating in the groupcast are not all supported in the resource pool, the UE may finally determine or consider groupcast option 1 as the HARQ feedback option for the specific groupcast traffic. The determination may be performed in the AS layer of the UE.

When the application layer and/or the V2X layer does not provide the information on the number of UEs within the group to the AS layer of the UE, the UE may determine or consider groupcast option 1 as the HARQ feedback option for the specific groupcast traffic. When the application layer and/or the V2X layer does not provide the information on the inner ID of the UE and/or information on the number of UEs within the group to the AS layer of the UE, the UE may determine or consider groupcast option 1 as the HARQ feedback option for the specific groupcast traffic. For example, the AS layer of the UE may determine or consider groupcast option 1 as the HARQ feedback option for the specific groupcast traffic.

Whether at least one of groupcast option 1 and/or groupcast option 2 is supported may be signaled to the UE, specifically for a resource pool. Whether at least one of groupcast option 1 and/or groupcast option 2 is supported may be signaled, specifically for a resource pool, to the UE for each service type, cast type, or QoS requirement. Whether a PSFCH resource related to groupcast option 1 is configured may be signaled, specifically for a resource pool, to the UE for each service type, cast type, or QoS requirement. Whether a PSFCH resource related to groupcast option 2 is configured may be signaled, specifically for a resource pool, to the UE for each service type, cast type, or QoS requirement.

The transmission UE may receive HARQ feedback from the multiple reception UEs. The transmission UE may receive groupcast option 1-based HARQ feedback from the multiple reception UEs. For example, the transmission UE may receive groupcast option 2-based HARQ feedback from the multiple reception UEs.

A specific groupcast option-based HARQ feedback operation may be required for specific groupcast traffic. When the reliability requirement related to the service is high and the transmission UE transmits the corresponding service to the reception UE, the reception UE is required to perform a groupcast option 2-based HARQ feedback operation. When the reception UE performs a groupcast option 1-based HARQ feedback operation for the service, a DTX problem may occur, and therefore, the reception UE is required to perform a groupcast option 2-based HARQ feedback operation for a service having a high reliability requirement. The DTX problem may be a problem where the transmission UE misinterprets that the reception UE has successfully received the PSCCH and the PSSCH, while the reception UE has actually failed to receive the PSCCH and does not transmit a NACK to the transmission UE. Due to the DTX problem, it may be difficult to satisfy the reliability requirement of the service. Therefore, when a specific groupcast option is not supported in the resource pool and a specific groupcast option is not supported for the corresponding traffic and/or service, the transmission UE may perform a blind re-transmission operation. When a PSFCH resource related to a specific groupcast option is not configured, the transmission UE may perform a blind re-transmission operation. The transmission UE may perform re-transmission without receiving the HARQ feedback from the reception UE.

The present disclosure provides a sidelink transmission method so that UEs performing NR sidelink communication, co-existing with UEs performing LTE sidelink communication can perform stable transmission and reception when the UEs operating LTE sidelink communication and NR sidelink communication co-exist in a co-channel and a base station allocates a resource for SL transmission to the UEs operating NR sidelink communication.

In mode 1 of an NR sidelink resource allocation method, a base station schedules a resource for sidelink transmission for the UE. NR sidelink resource allocation mode 1 collectively refers to a scheduling scheme of performing sidelink resource allocation through a sidelink dynamic grant and sidelink resource allocation through a configured grant. The sidelink dynamic grant is a scheme in which the UE receives, from the base station, scheduling of a resource of corresponding transmission at every transmission using a sidelink. The sidelink configured grant is a scheme in which in a case where the UE receives a configuration of a specific cycle from the base station, when the UE has traffic to be transmitted by the UE through a sidelink by using time and frequency resources configured from the base station at every cycle, the UE performs transmission through a resource periodically configured by the corresponding configured grant. For the sidelink configured grant, two types corresponding to Type 1 and Type 2 may be used as in the same scheme used in the conventional NR system, transmission through a configured grant activated in the RRC is Type 1, and transmission of activating a grant configured via DCI is Type 2.

Figure 22:
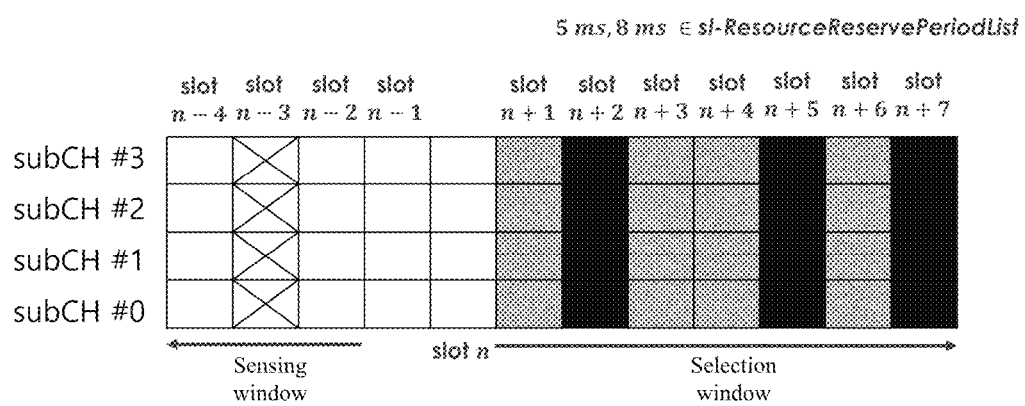
FIG. 22 illustrates an example of a resource exclusion process in a sidelink mode 2 resource allocation process, as an embodiment of the present disclosure.

FIG. 22 illustrates an example of a resource exclusion process in a sidelink mode 2 resource allocation process, as an embodiment of the present disclosure.

Specifically, when an NR sidelink UE performs a mode 2 (i.e., Type 2) resource allocation process, a physical layer configures a set of radio resources according to a specific rule, and the corresponding set is reported to a higher layer. The higher layer selects and finally determines a radio resource in the reported set of radio resources, and the UE uses the corresponding radio resource for PSCCH/PSSCH transmission. When the higher layer triggers (re)selection for resource allocation, the physical layer performs a Type 2 resource allocation process. The higher layer provides the physical layer with a parameter such as a resource pool, an L1 priority (prio_TX), a remaining packet delay budget (PDB), the number (L) of subchannels used for PSCCH/PSSCH transmission in one slot, and resource reservation interval (P_rsrp_TX). A candidate single-slot resource (R_(x,y)) is a radio resource including L consecutive subchannels in one slot. As mentioned above, the UE reports a set (S_A) including several candidate single-slot resources to the higher layer.

When performing the NR sidelink mode 2 resource allocation process, the UE performs resource allocation based on sensing information from a time point at which (re)selection for resource allocation is triggered to a specific time slot, among pieces of previous sensing information. In the NR sidelink mode 2 resource allocation scheme, one of candidate single-slot resources within a resource selection window is allocated. In this case, the size of the resource selection window is determined by the remaining PDB of the packet to be transmitted and the higher layer configuration.

The NR sidelink mode 2 resource allocation process includes an initial process and a resource exclusion process. The initial process is a process in which the UE configures S_A corresponding to a resource set including multiple candidate single-slot resources as all candidate single-slot resources in the resource selection window. Thereafter, the UE excludes candidate single-slot resources satisfying a specific condition from S_A.

For the reason of transmission in a specific slot, or the like, when the UE fails to monitor the corresponding slot, the UE removes, from S_A, candidate single-slot resources within a slot spaced apart by a multiple of a resource reserve period within a "resource reserve period list" from the corresponding slot.

For example, as illustrated in FIG. 22, in the NR sidelink mode 2 resource allocation process, a specific resource (e.g., a candidate single-slot resource) may be excluded from a resource set.

Specifically, as illustrated in FIG. 22, in slot n, a selection for resource allocation may be trigged for the UE from the higher layer. In a situation in which the UE fails to monitor a corresponding slot (slot (n−3)) before three slots from slot n and 5 ms and 8 ms are configured for the resource reserve period list, all candidate single-slot resources corresponding to 5 ms, 8 ms, and 10 ms may be excluded from a time point at which the UE fails to monitor the corresponding slot.

Figure 23:
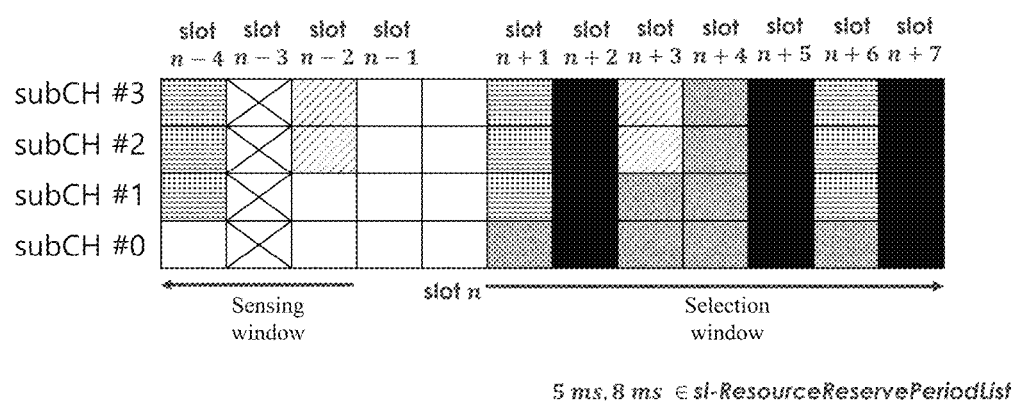
FIG. 23 illustrates another example of a resource exclusion process in a sidelink mode 2 resource allocation process, as an embodiment of the present disclosure.

FIG. 23 illustrates another example of a resource exclusion process in a sidelink mode 2 resource allocation process, as an embodiment of the present disclosure.

Referring to FIG. 23, the UE excludes a candidate single-slot resource satisfying a following condition from S_A. When the UE successfully receive and decode sidelink control information (SCI) in a specific slot, the UE may identify a value (P_rsrp_RX) of a "resource reservation period" field and a value (prio_RX) of a "priority" field. In addition, the UE measures RSRP to identify whether the corresponding RSRP measurement value exceeds an RSRP threshold value. When the RSRP measurement value exceeds the RSRP threshold value, the UE excludes, from S_A, a candidate single-slot resource overlapped with the same frequency resource of a slot spaced apart by a multiple or P_rsrp_RX from a radio resource in which transmission of another UE is received. When the size of S_A is smaller than the product of the number of initial candidate single-slot resources and a configured number between 0 and 1, the UE repeats again the process above from the initial process after increasing the RSRP threshold by 3 dB.

For example, as illustrated in FIG. 23, a specific resource may be excluded in the NR sidelink mode 2 resource allocation process.

Specifically, as illustrated in FIG. 23, after the resource exclusion process described in FIG. 22, an additional resource exclusion process may be performed. An indicated situation is that the UE has detected transmission of another UE before four slots and two slots from slot n, has successfully decoded PSCCH/PSSCH transmission of another UE, and the RSRP measurement value is greater than the RSRP threshold value. In this case, when SCI transmitted by other UEs in the respective transmissions is decoded and resource reservation intervals are all 5 ms, the UE removes, from S_A, a candidate single-slot resource overlapped with the same frequency resource of a slot spaced apart by a multiple of 5 ms from the time and frequency resources in which the respective transmission are performed.

When an LTE sidelink UE and an NR sidelink UE co-exist in a co-channel, the NR sidelink UE needs to additionally consider transmission of the LTE sidelink UE in the mode 2 resource allocation process. When the transmission of the LTE sidelink UE is not considered, the NR sidelink UE and the LTE sidelink UE may perform transmission by using the same time and frequency resource, which may degrade the stability of communication. However, NR and LTE are different radio access technologies (RATs) from each other, and thus the UE equipped with an NR sidelink module only cannot decode LTE sidelink transmission. Accordingly, the present disclosure assumes a situation in which one UE is equipped with both an NR sidelink module and an LTE sidelink module, and the UE is referred to as a Type A UE.

Figure 24:
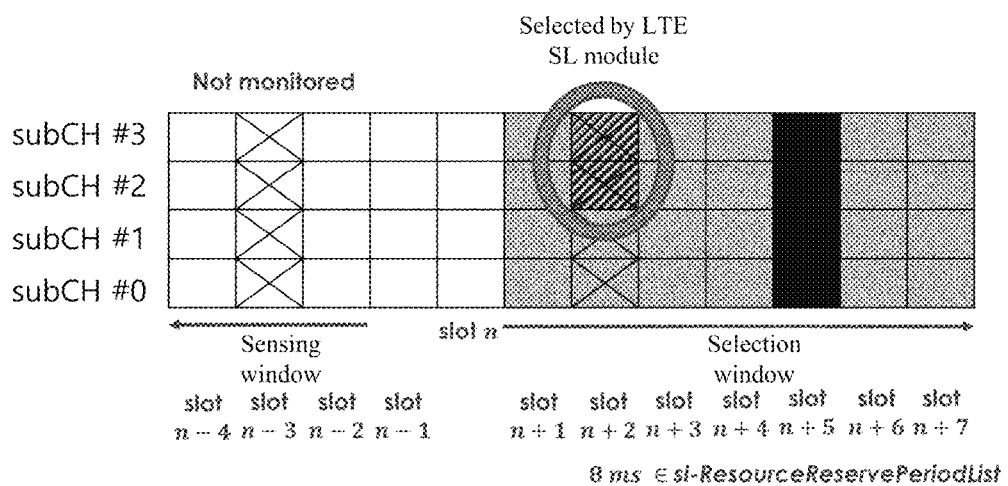
FIG. 24 illustrates an example of an NR sidelink mode 2 resource allocation process of a Type A UE, as an embodiment of the present disclosure.
Figure 25:
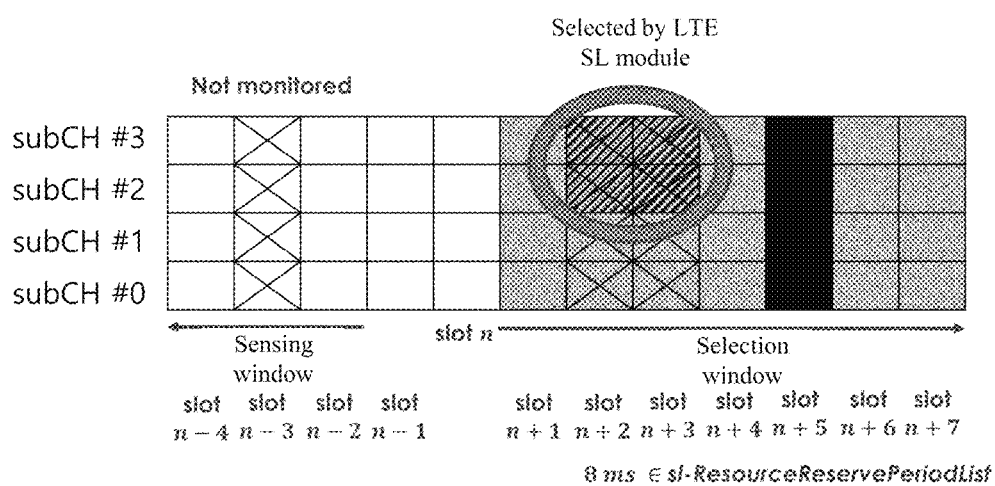
FIG. 25 illustrates another example of an NR sidelink mode 2 resource allocation process of a Type A UE, as an example of the present disclosure.

FIGS. 24 and 25 illustrates an example of an NR sidelink mode 2 resource allocation process of a Type A UE, as an embodiment of the present disclosure.

Referring to FIGS. 24 and 25, when some or all of resources of signals to be transmitted by a Type A UE in an NR sidelink module and an LTE sidelink module are overlapped, a signal of the NR sidelink module may be transmitted in a resource remaining after excluding the resource of the signal to be transmitted in the LTE sidelink module from the resource of the signal to be transmitted in the NR sidelink module.

Specifically, the Type A UE is equipped with both the NR sidelink module and the LTE sidelink module (legacy module), and thus the Type A UE may receive and decode all signals transmitted from the NR sidelink UE and the LTE sidelink UEs, and may transmit all signals for NR sidelink communication and LTE sidelink communication. Accordingly, resource allocation for transmission and reception of the NR sidelink and the LTE sidelink may be required, and when the transmission and reception of the NR sidelink and the LTE sidelink are simultaneously performed, collision/overlapping of resources may occur.

That is, a case where some or all of the resources allocated for LTE sidelink communication and some or all of the resources allocated for NR sidelink communication collide/overlap with each other, and in this case, the Type A UE may cancel the resource for NR sidelink communication or the resource for LTE sidelink communication from the overlapping resources. In this case, the Type A UE may be a half-duplex UE incapable of simultaneous transmission/reception.

Specifically, when a resource set including multiple candidate single-slot resources to transmit a specific signal (e.g., a PSSCH/PSCCH, or the like) of the NR sidelink is partially or fully overlapped with a candidate single subframe resource for transmitting a specific signal (a legacy signal, for example, a PSSCH/PSCCH, or the like) of the LTE sidelink, the Type A UE may determine, as a resource for transmitting the specific signal of the NR sidelink, a resource (a subset of resources) remaining after excluding a candidate single-slot resource overlapped with the candidate single subframe resource for transmitting the specific signal of the LTE sidelink from the resource set. In this case, there may be a specific condition for excluding the candidate single-slot resource overlapped with the single subframe resource for transmitting the specific signal of the LTE sidelink from the resource set.

For example, a resource set including one or more candidate resources (or one or more candidate single-slot resources) allocated for a PSSCH/PSCCH to be transmitted in the NR sidelink module of the Type A module may be partially/fully overlapped with a resource (a first resource) allocated to the resource for the PSSCH/PSCCH to be transmitted in the LTE sidelink module on the time axis. In this case, the Type A UE may compare a priority (a first priority) of the PSSCH/PSCH to be transmitted in the NR sidelink module with a priority (a second priority) of the PSSCH/PSCCH to be transmitted in the LTE sidelink module, so as to determine, as a resource for transmitting the PSSCH/PSCCH to be transmitted in the NR sidelink module, a resource (a subset of resources) remaining after excluding at least one candidate resource (at least one first candidate resource or at least one first candidate single-slot resource) overlapped with the first resource from the one or more candidate resources according to the priorities.

In this case, when the PSSCH/PSCCH to be transmitted in the LTE sidelink module is periodically transmitted, the overlapped resource and the overlapped candidate resources at each cycle are all excluded from the resource set of the one or more candidate resources and the resource for transmitting the PSSCH/PSCCH in the NR sidelink module may be selected.

As another embodiment of the present disclosure, when the first priority is lower than the second priority, that is, when a value of the first priority is greater than a value of the second priority, a resource obtained by excluding at least one candidate resource (or at least one candidate single-slot resource) overlapped with the first resource among the one or more candidate resources constituting a first resource set may be determined as a resource for transmitting the PSSCH/PSCCH to be transmitted in the NR sidelink module. However, when the first priority is higher than the second priority, that is, when a value of the first priority is smaller than a value of the second priority, a resource remaining after excluding at least one candidate resource overlapped with the first resource among the one or more candidate resources constituting a first resource set according to a selection of the UE or an unexcluded resource may be determined as a resource set for transmitting the PSSCH/PSCCH. That is, it may vary according to the implementation of the UE.

In other words, when the Type A UE is equipped with both the LTE sidelink module and the NR sidelink module and the corresponding UE is positioned outside a base station range, the LTE sidelink module performs an LTE sidelink mode 4 resource allocation process and the NR sidelink module performs an NR sidelink mode 2 resource allocation process. When a single-subframe resource selected by the LTE sidelink module, with which the Type A UE is equipped, through the LTE sidelink mode 4 process is overlapped with a single-slot resource selected by the NR sidelink module through the NR sidelink mode 2 process, the Type A UE may only perform transmission by using one RAT between two RATs.

Accordingly, when the priority of the PSCCH/PSSCH to be transmitted in the NR sidelink module in the NR sidelink mode 2 resource allocation process is lower than the priority of the PSCCH/PSSCH or an S-SSB to be transmitted in the LTE sidelink module (that is, when a value of a priority of LTE SCI is smaller), all candidate single-slot resources overlapped with the single-subframe resource allocated in the LTE sidelink on the time axis may be removed from S_A. The present disclosure assumes that LTE sidelink transmission information required for the Type A UE to perform the NR sidelink resource allocation module 2 of the NR sidelink module shared from the LTE sidelink module at a time point earlier than slot n in which NR sidelink resource allocation is triggered. In this case, LTE sidelink transmission information required to perform NR sidelink resource allocation mode 2 may be time-frequency resource information of a radio resource used when performing LTE sidelink transmission in the Type A LTE sidelink module, the priority of transmitted traffic (PSCCH, PSSCH, or S-SSB), a resource reservation period value for transmitted traffic, time-frequency resource information of a radio resource used for transmission by another LTE sidelink UE, a priority of traffic transmitted by another UE, a resource reservation period value for traffic transmitted by another UE, an RSRP measurement value for transmission of another UE, etc.

For example, as illustrated in FIGS. 24 and 25, when the Type A UE performs the NR sidelink mode 2 resource allocation process, reflecting resource information allocated by the LTE sidelink module is indicated. FIG. 24(a) illustrates a situation in which the NR sidelink module receives a configuration of SCS of 15 kHz. In this case, when the priority of the S-SSB or the PSCCH/PSSCH to be transmitted by the LTE sidelink module is higher than the priority of the PSCCH/PSSCH to be transmitted by the NR sidelink module and the LTE sidelink module of the Type A UE has allocated a subframe corresponding to slot n+2 and frequency resources corresponding to subchannels #2 and #3, the NR sidelink module excludes all candidate single-slot resources corresponding to slot n+2 from the resource set (S_A). FIG. 25 illustrates a situation in which the NR sidelink module receives a configuration of SCS of 30 kHz. In this case, when the priority of the S-SSB or the PSCCH/PSSCH to be transmitted by the LTE sidelink module is higher than the priority of the PSCCH/PSSCH to be transmitted by the NR sidelink module and the LTE sidelink module of the Type A UE has allocated LTE subframes corresponding to NR-based slots n+2 and n+3 and frequency resources corresponding to subchannels #2 and #3, the NR sidelink module excludes all candidate single-slot resources corresponding to slots n+2 and n+3 from the resource set (S_A).

On the other hand, in a case where the priority of the PSCCH/PSSCH to be transmitted in the NR sidelink module is higher than the priority of the PSCCH/PSSCH or the S-SSB to be transmitted in the LTE sidelink module in the NR sidelink mode 2 resource allocation process, when the NR sidelink module performs the NR sidelink mode 2 resource allocation process, transmission information of the LTE sidelink module may not be considered. In a case where the priority of the PSCCH/PSSCH to be transmitted in the NR sidelink module is identical to the priority of the PSCCH/PSSCH or the S-SSB to be transmitted in the LTE sidelink module, when the NR sidelink module performs the NR sidelink mode 2 resource allocation process, resource allocation may be performed by assuming that the priority of a packet transmitted in the LTE sidelink module is higher and transmission information of the LTE sidelink module is considered. Accordingly, in this case, the above-mentioned resource exclusion process may be applied when NR sidelink mode 2 resource allocation is performed.

Figure 26:
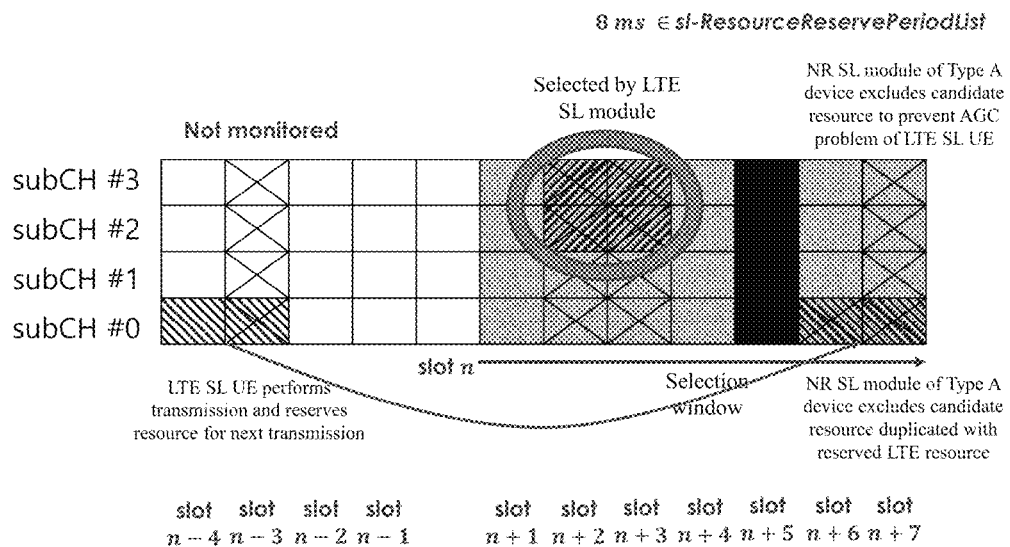
FIG. 26 illustrates an example of a slot structure for a PSFCH occasion configured for a UE in an NR sidelink.

FIG. 26 illustrates another example of an NR sidelink mode 2 resource allocation process of a Type A UE, as an example of the present disclosure.

Referring to FIG. 26, when the Type A UE receives a signal including resource allocation information from another LTE sidelink UE, the Type A UE may transmit a signal of the NR sidelink module in a resource remaining after excluding a resource allocated by resource allocation information of a signal transmitted from another LTE sidelink UE from a resource of a signal to be transmitted in the NR sidelink module according to a specific condition.

The Type A UE includes both the NR sidelink module and the LTE sidelink module, and thus when a specific signal (e.g., a PSSCH/PSCCH, etc.) is to be transmitted through the NR sidelink module, a resource allocated for a signal transmitted from another external LTE UE also needs to be considered. Specifically, the Type A UE includes the LTE sidelink module, and thus a signal (a second legacy signal) transmitted from another LTE UE may be also received and decoded. Accordingly, the Type A UE may receive a signal including a priority and resource allocation information for signal transmission of another LTE UE from another LTE UE. In this case, when a resource set including one or more candidate resources (or one or more candidate single-slot resources) allocated for a specific signal to be transmitted thorough the NR sidelink module is partially or fully overlapped with a resource (a second resource) included in resource allocation information on the time axis, the Type A UE may determine, as a resource for transmitting the specific signal, a resource remaining after excluding at least one candidate resource (or at least one candidate single-slot resource) overlapped with the second resource among the one or more candidate resources of the resource set.

In this case, the at least one candidate resource overlapped with the second resource may be excluded or may not be excluded from the resource set according to a specific condition.

For example, when receiving a signal (a second legacy signal) including a priority (a third priority) and resource allocation information from another LTE UE, the Type A UE may measure a signal strength (e.g., reference signal received power (RSRP), etc.) of the received signal to compare the measured signal strength with a threshold value. When the signal strength is greater than the threshold value, a resource remaining after excluding at least one candidate resource overlapped with the second resource on the time axis from among the one or more candidate resources constituting the resource set may be selected as a resource for transmitting the specific signal.

However, when the signal strength is less than the threshold value, the corresponding signal may be ignored, and the specific signal may be transmitted in the allocated resource set.

In this case, the threshold value may be determined in consideration of both the priority (the first priority) of the specific signal and the priority (the third priority) included in the second legacy signal. For example, there may be eight priorities for the signal to be transmitted in the NR sidelink module and threshold values for each of the eight priorities for the signal transmitted from another UE (that is, there are 64 threshold values in consideration of each priority).

In addition, as another embodiment of the present disclosure, when the first priority corresponding to a priority of the specific signal to be transmitted in the NR sidelink module of the Type A UE is lower than the priority (the third priority) included in the signal transmitted from another LTE UE (that is, when a value of the first priority is greater than a value of the third priority), the threshold value may be configured to be a negative infinity value and configured so that the value of the signal strength always becomes greater than the threshold value. Conversely, when the first priority corresponding to a priority of a specific signal to be transmitted in the NR sidelink module of the Type A UE is higher than the priority (the third priority) included in the signal transmitted from another LTE UE (that is, when a value of the first priority is smaller than a value of the third priority), the threshold value may be configured to be an infinity value and configured so that the value of the signal strength becomes smaller than the threshold value.

As another embodiment of the present disclosure, the above-describe embodiment in which a signal transmitted from another UE is considered may be used together with the method described in FIGS. 24 and 25.

That is, a resource remaining after excluding a resource overlapped by additionally considering a signal transmitted from an external LTE UE from a resource determined in consideration of the NR sidelink module and the LTE sidelink module may be determined as a resource for transmitting a specific signal (e.g., PSSCH/PSCCH, etc.) through the method described in FIGS. 24 and 25.

In other words, when the Type A UE performs the NR sidelink mode 2 resource allocation process, LTE sidelink transmission information of another LTE sidelink UE may be considered in addition to resource information selected in the LTE sidelink module. When the Type A UE has successfully received and decoded LTE sidelink transmission of another LTE sidelink UE and has acquired resource reservation period and priority information, the Type A UE may use the corresponding information transferred from the LTE sidelink module in the NR sidelink mode 2 resource allocation process. When the priority of the S-SSB and the PSCCH/PSSCH transmitted by another LTE sidelink UE is higher than the priority of the PSCCH/PSSCH to be transmitted by the Type A UE, the Type A UE may exclude, from S_A, all the same frequency resources of a slot spaced apart by a multiple of resource reservation periods from a slot in which LTE sidelink transmission occurs in the NR sidelink mode 2 resource allocation process. When the priority of the S-SSB or the PSCCH/PSSCH to be transmitted by another LTE sidelink UE is lower than the priority of the PSCCH/PSSCH to be transmitted by the Type A UE and the Type A UE performs the resource exclusion process, a candidate single-slot resource overlapped with a single subframe resource reserved by another LTE sidelink UE may be excluded from S_A for a case where an LTE RSRP measurement value is higher than a configured RSRP threshold value in consideration of the configured RSRP threshold value and the RSRP measurement value measured by the LTE sidelink module of the Type A UE. Similarly, when the size of S_A is smaller than a specific ratio of the initial size, the corresponding process may be repeated by increasing the RSRP threshold value by 3 dB.

When the Type A UE performs the NR sidelink mode 2 resource allocation process, for a case where SCS of a configured NR sidelink resource pool is greater than 15 kHz, an additional candidate single-slot resource may be excluded from S_A to resolve a latent automatic gain control (AGC) issue which may occur in another LTE sidelink UE. When the Type A UE has successfully received and decoded transmission of another LTE sidelink UE, the Type A UE may remove, from S_A, a candidate single-slot resource for a slot remaining after excluding the first slot from among slots overlapped with a subframe in which LTE sidelink transmission is scheduled.

For example, as illustrated in FIG. 26, an illustrated process is that in a situation in which SCS configured in the NR sidelink resource pool is 30 kHz, a radio resource is additionally exclude from a resource set, in addition to a candidate single-slot resource excluded in the existing NR sidelink mode 2 process. When another LTE sidelink UE has transmitted the PSSCH and the PSSCH in slots n−4 and n−3, when the priority the corresponding LTE PSCCH/PSSCH is higher than the priority of the NR PSCCH/PSSCH to be transmitted by the Type A UE, and when single-subframe resources corresponding to slots n+6 and n+7 are reserved through a "resource reservation" field of LTE SCI, the NR sidelink module of the Type A UE excludes, from S_A, a candidate single-slot resource overlapped with the reserved single-subframe resource. In addition, in order to prevent an ADC saturation phenomenon which may occur in the LTE sidelink UE, the NR UE may exclude, from S_A, all candidate single-slot resources for slot n+7 corresponding to a slot remaining after excluding the first slot from among slots overlapped with the single-subframe resource reserved by another LTE sidelink UE.

Through the above-described method, the Type A UE may transmit a specific signal through a resource determined in consideration of both NR and LTE.

Figure 27:
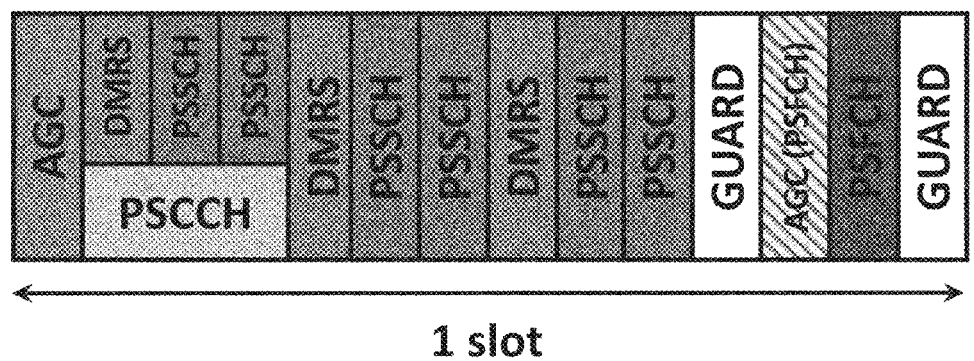
FIG. 27 illustrates an example of an AGC problem which may occur in an LTE sidelink UE when the LTE sidelink UE and an NR sidelink UE co-exist in a co-channel.

FIG. 27 illustrates an example of a slot structure for a PSFCH occasion configured for a UE in an NR sidelink.

Specifically, as illustrated in FIG. 27, the illustrated slot structure starts from symbol 0, has a length of 14 sidelink symbols, and indicates a slot structure corresponding to a PSFCH occasion having received a configuration of three symbols of PSCCH and three symbols of PSSCH DMRS. In the corresponding slot structure, the NR sidelink UE performs PSCCH and PSSCH transmission or reception from symbol 0 to symbol 9. Thereafter, PSFCH transmission or reception is performed for two OFDM symbols after a guard symbol corresponding to one symbol. All NR sidelink UEs using the corresponding carrier are configured with the same higher-layer parameter and share the same NR sidelink slot structure.

However, when UEs performing LTE sidelink communication and NR sidelink communication co-exist in a co-channel, the UE performing the LTE sidelink communication does not required feedback, and since there is no feedback channel, when the LTE sidelink UE transmits the PSSCH, an NR PSFCH occasion for UEs performing the NR sidelink communication co-existing in the same channel is not considered. Accordingly, when the UE performing the LTE sidelink communication performs transmission in a slot corresponding to the NR PSFCH occasion and the NR sidelink UE performs PSFCH transmission in the corresponding slot, the UEs are interfered by each other, which may lead to reduction in the efficiency of the NR sidelink communication and the LTE sidelink communication.

For example, when the UE performing the LTE sidelink communication and the UE performing the NR sidelink communication use the same time resource, a problem may occur in an automatic gain control (AGC) process from the side of the UE performing the LTE sidelink communication.

Figure 28:
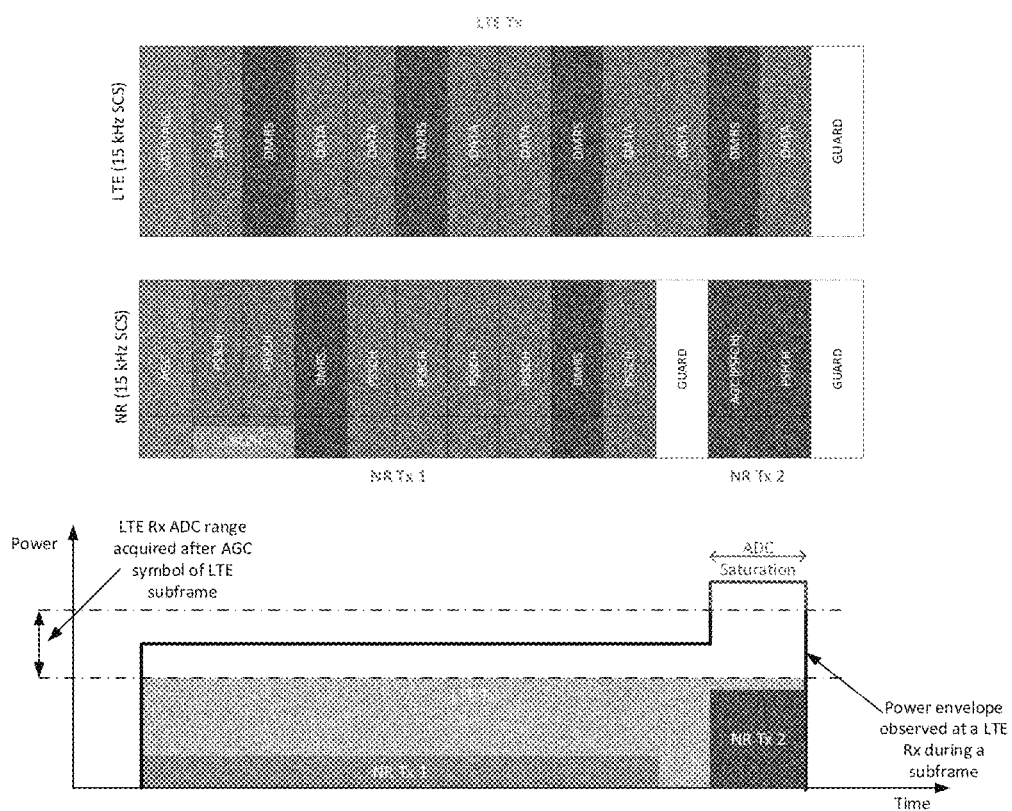
FIG. 28 illustrates an example of an operation of PSFCH transmission of an NR sidelink UE when the NR sidelink UE and an LTE sidelink UE co-exist in a co-channel, as an example of the present disclosure.

FIG. 28 illustrates an example of an AGC problem which may occur in an LTE sidelink UE when the LTE sidelink UE and an NR sidelink UE co-exist in a co-channel.

Specifically, FIG. 28 illustrates a problem which may occur when an NR sidelink resource pool uses SCS of 15 kHz and the LTE sidelink UE and the NR sidelink UEs use the same subframe and perform transmission. When the corresponding slot or subframe is assumed as an NR PSFCH occasion, UEs performing NR PSSCH transmission may use symbols 0 to 9 for PSCCH and PSSCH transmission in an NR slot format of FIG. 28. In this case, symbol 0 is used as an AGC symbol for NR PSSCH transmission and reception, and the same contents as those of transmission of symbol 1 are transmitted to symbol 0. The UEs performing the NR PSFCH transmission may use symbols 11 and 12 for PSFCH transmission in the NR slot format of FIG. 26. In this case, symbol 11 is used for an AGC symbol for NR PSFCH transmission and reception, and the same contents as those of transmission of symbol 12 are transmitted to symbol 11. In a case of the LTE sidelink a PSFCH does not exist, and only transmission of the PSCCH and the PSSCH is allowed, and thus an LTE PSSCH transmission UE uses symbols 0 to 12 for PSCCH and PSSCH transmission in the LTE subframe format of FIG. 26. In this case, symbol 0 is used as a symbol for AGC control. When a UE for transmitting an NR PSSCH and a UE for transmitting an NR PSFCH exist around an LTE sidelink UE which is to receive an LTE PSSCH, the LTE PSSCH reception UE considers only transmission power of the NR PSSCH transmission UE in the ACG control process, and transmission power of the NR PSFCH transmission UE cannot be considered. As illustrated in FIG. 26, on the side of the LTE PSSCH reception UE, when NR PSFCH transmission power is greater than NR PSSCH transmission power, the LTE PSSCH reception UE may experience ADC saturation in the NR PSFCH symbol, and the decoding performance of the LTE sidelink UE may be degraded. Accordingly, transmission and reception of PSCCH/PSSCH transmission of the UE performing LTE sidelink communication existing as legacy may fail and inefficient communication may thus occur.

To resolve the problem, the present disclosure proposes a PSFCH transmission method of an NR sidelink UE when the NR sidelink UE and an LTE sidelink UE co-exist in a co-channel. The present disclosure assumes that the NR sidelink UE is equipped with an NR sidelink module and an LTE sidelink module and LTE PSCCH and LTE PSSCH transmission of the LTE sidelink UE may be decoded.

When an NR PSFCH occasion is configured in a situation in which the NR sidelink UE and the LTE sidelink UE co-exist in the co-channel, the NR sidelink UE may transmit an NR PSFCH to a slot corresponding to the configured NR PSFCH occasion. In this case, when the LTE PSSCH transmission is detected in the corresponding slot, the NR PSFCH transmission UE may not perform PSFCH transmission in the corresponding slot. The NR PSFCH transmission UE may postpone PSFCH transmission to the next NR PSFCH occasion instead of simply dropping the PSFCH transmission. In this case, a maximum number of times of postponing the NR PSFCH transmission to the next NR PSFCH occasion may be limited, the corresponding number of times may be configured via RRC signaling, or a PSFCH occasion available within a time budget which can be configured by a packet delay budge (PDB) of the received PSSCH is limited, whereby the PSFCH reception UE can minimize a burden of blind decoding. This effect can be achieved specifically in a groupcast mode requiring NACK-only feedback.

For example, in the groupcast mode requiring NACK-only feedback, only when the NR PSSCH reception UE fails to detect NR PSSCH transmission or fails to decode the received transmission, NACK feedback is transmitted via the PSFCH, and when decoding of the received NR PSSCH has been successfully performed, ACK feedback is not transmitted. In a case where the NR sidelink UE and the LTE sidelink UE co-exist in the co-channel and LTE transmission is scheduled or LTE transmission is detected in an NR PSFCH occasion slot, when PSFCH transmission of the NR sidelink UE is dropped for the reason of ADC saturation of the LTE sidelink UE, in the groupcast mode performing NACK-only feedback, the NR PSSCH transmission UE may recognize the PSSCH transmission as ACK even though the PSSCH transmission is recognized as NACK by the reception UE and NACK-only feedback fails to be received because PSFCH transmission is not performed. This may cause degradation in the stability of communication, and thus postponing the NR PSFCH transmission to the next NR PSFCH according to a situation when different RATs co-exist in the co-channel may be a method for increasing the stability of LTE sidelink transmission and NR sidelink transmission.

Figure 29:
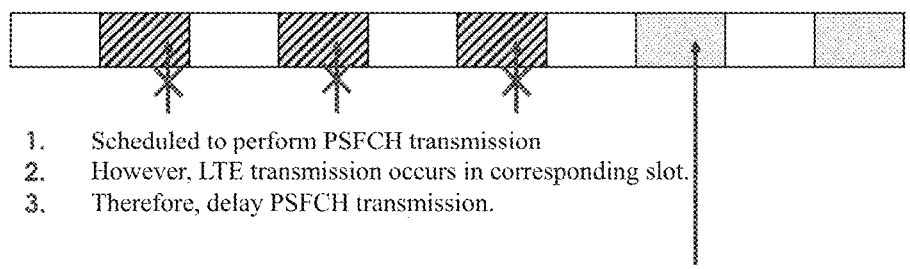
FIG. 29 illustrates an example of a case of a collision of transmission of a PSFCH, as an example of the present disclosure.

FIG. 29 illustrates an example of an operation of PSFCH transmission of an NR sidelink UE when the NR sidelink UE and an LTE sidelink UE co-exist in a co-channel, as an example of the present disclosure.

Specifically, the NR sidelink UE is equipped with an LTE sidelink module and may thus identify the existence of LTE sidelink transmission in a slot corresponding to an NR PSFCH occasion. For example, an NR PSFCH transmission UE may detect LTE sidelink transmission through decoding of symbols 0 to 9 of an NR PSFCH occasion slot by using the LTE sidelink module. Alternatively, the NR PSFCH transmission UE may receive an LTE PSCCH transmitted from a previous subframe by using the LTE sidelink module and decode a reservation for the NR PSFCH occasion slot. When the NR PSFCH transmission UE identifies the LTE sidelink transmission in the slot corresponding to the NR PSFCH occasion, the NR PSFCH transmission UE may postpone the NR PSFCH transmission to the next NR PSFCH occasion slot. When the LTE sidelink transmission does not occur in the NR PSFCH occasion slot, the NR PSFCH transmission UE may perform the NR PSFCH transmission in the corresponding slot. In this case, to minimize a burden of blind decoding of the NR PSFCH reception UE, the NR PSFCH transmission UE may limit a maximum number of times of postponing the NR PSFC transmission to the next NR PSFCH occasion slot, may configure the corresponding number of times via RRC signaling, or may limit the transmission to the PSFCH occasion available within a time budget which can be configured by a PDB of a received PSSCH. In a case where the NR PSFCH transmission UE postpones the NR PSFCH transmission, when the limited number of times is exceeded or the corresponding transmission is postponed after the PSFCH occasion available within the time budget, the NR PSFCH transmission UE may not perform the NR PSFCH transmission.

When the NR PSFCH transmission UE postpones the PSFCH transmission to the next NR PSFCH occasion slot because the LTE sidelink UE and the NR sidelink UE co-exist, the NR PSFCH transmission UE may experience a situation in which several PSFCHs need to be transmitted to one PSFCH reception UE in a slot corresponding to the next NR PSFCH occasion slot.

Figure 30:
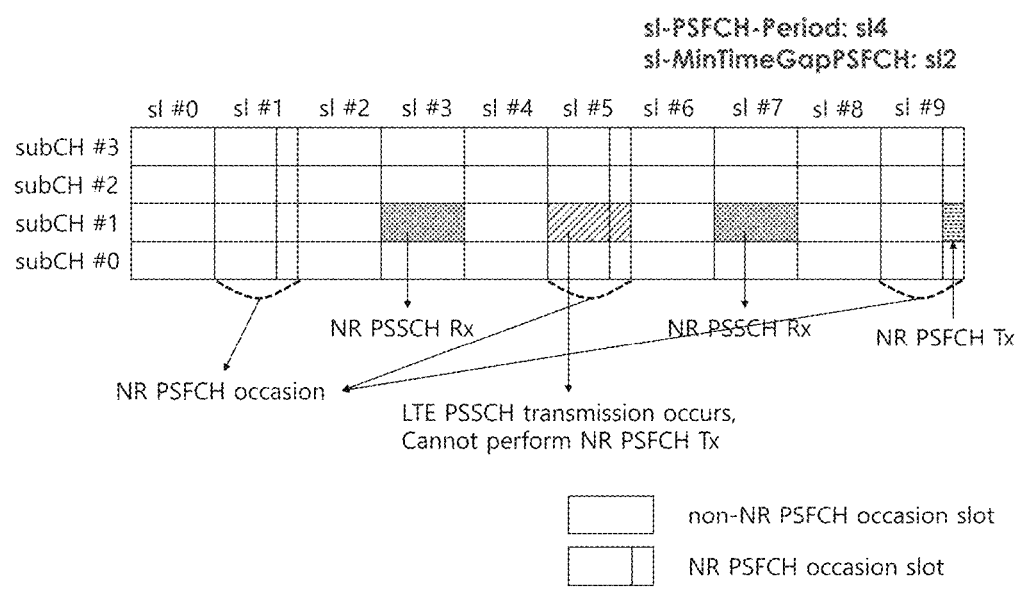
FIG. 30 illustrates an example of a time-frequency resource of a PSFCH transmitted when a UE multiplexes several pieces of HARQ feedback and transmits the PSFCH by using one PRB, as an example of the present disclosure.

FIG. 30 illustrates an example of a case of a collision of transmission of a PSFCH, as an example of the present disclosure.

Specifically, as illustrated in FIG. 30, a described situation is a situation of an NR PSFCH transmission UE in a sidelink resource pool including four subchannels when a PSFCH period is configured to be four slots and a minimum gap time from PSSCH reception to PSFCH transmission is configured to be two slots in the corresponding resource pool. In FIG. 30, since NR PSSCH reception occurs in slot 3 and subchannel 1, the NR PSFCH transmission UE needs to transmit HARQ feedback of the corresponding transmission through a PSFCH by using one PRB of subchannel 1 of slot 5. However, when transmission of the LTE sidelink UE is detected in subchannel 1 of slot 5, the NR PSFCH transmission UE needs to postpone the transmission of the PSFCH to slot 9 corresponding to the next PSFCH occasion slot. However, when the NR PSSCH transmission UE of slot 3 transmits the PSSCH in slot 7 again and the PSFCH transmission UE receives the same, the number of PSFCHs to be transmitted in the same PSFCH resource in slot 9 is doubled. That is, a PRB to be used for PSFCH transmission corresponding to the PSSCH received in slot 3 postponed due to the detection of the LTE sidelink transmission is identical to a PRB to be used for PSFCH transmission corresponding to a PSSCH received in slot 7, and thus upon the existing NR sidelink UE operation, the PSFCH transmission UE may perform only PSFCH transmission corresponding to the most recently received PSSCH, and the PSFCH transmission configured to be postponed and transmitted and the PSFCH transmission corresponding to the most recently received PSSCH cannot be performed all at once.

To solve this problem, the present disclosure proposes, as a method in which the PSFCH transmission UE simultaneously transmits the postponed PSFCH transmission and the PSFCH transmission corresponding to the most recently received PSSCH, a method for performing multiplexing and transmission. That is, the present disclosure proposes a method for multiplexing several pieces of HARQ-ACK feedback into one PRB when the PSFCH transmission needs to transmit several PSFCHs to the same NR PSSCH transmission UE through one PRB in one PSFCH occasion slot.

The PSFCH transmission UE may transmit only one ACK or NACK within one PRB, and thus when several pieces of HARQ feedback is multiplexed into one piece of HARQ feedback and transmitted, ACK feedback is transmitted only when all the HARQ feedback is ACK. When there is one piece of NACK feedback among the several pieces of HARQ feedback, the PSFCH transmission UE transmits NACK feedback. For example, as in the example of FIG. 28, when a situation in which the PSFCH transmission UE needs to multiplex feedback on the PSSCH transmission occurring in slot 3 and feedback on the PSSCH transmission occurring in slot 7 and transmit a PSFCH in slot 9 by using one PRB occurs, the PSFCH transmission UE may transmit ACK feedback through the PSFCH in slot 9 only when both the feedback on the PSSCH reception in slot 3 and the feedback on the PSSCH reception in slot 7 correspond to ACK. When both the feedback on the PSSCH reception in slot 3 and the feedback on the PSSCH reception in slot 7 correspond to NACK, the NR PSFCH transmission UE may transmit NACK feedback in slot 9 through the PSFCH. Alternatively, one of the feedback on the PSSCH reception in slot 3 and the feedback on the PSSCH reception in slot 7 is ACK feedback and the other is NACK feedback, the PSFCH transmission UE may transmit NACK feedback in slot 9 through the PSFCH. When receiving multiplexed NACK feedback in slot 9, the NR PSSCH transmission UE may re-transmit the PSSCH transmitted in slot 3 and the PSSCH transmitted in slot 7.

The next description below is about a PSFCH time-frequency resource selection method in a case where the NR PSFCH transmission UE multiplexes HARQ feedback and performs PSFCH transmission. In a case where the NR sidelink UE and the LTE sidelink UE co-exist in a co-channel, when postponing PSFCH transmission to the next NR PSFCH occasion slot, the NR PSFCH transmission UE may multiplex several pieces of HARQ feedback by using one PRB and transmit the same. In this case, a time-frequency resource of the PSFCH through which the multiplexed HARQ feedback is transmitted follows a time-frequency resource of a PSFCH associated with the most recently received PSSCH.

Figure 31:
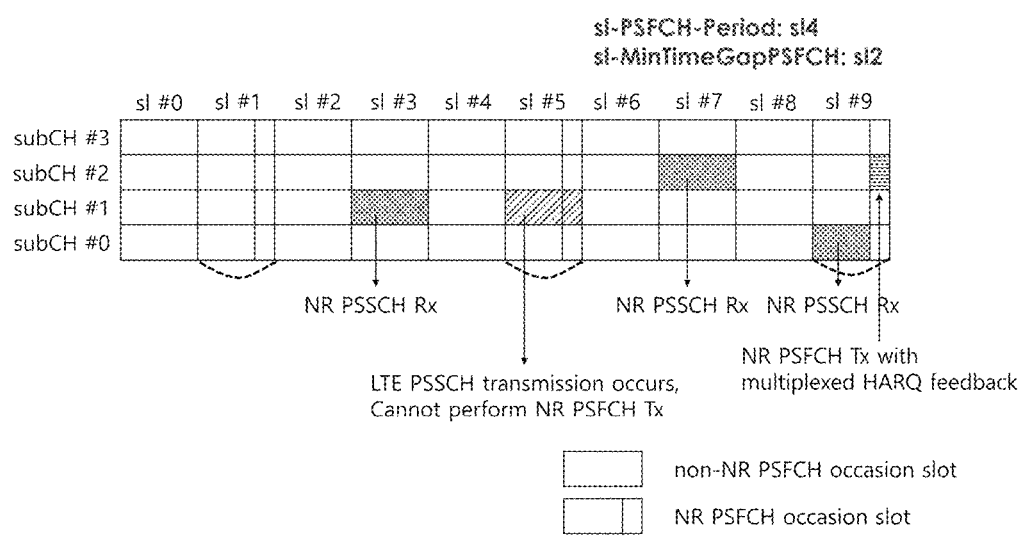
FIG. 31 illustrates an example of a cyclic shift applied to a transmitted PRB when a UE multiplexes two pieces of HARQ feedback and transmits a PSFCH by using one PRB, as an example of the present disclosure.

FIG. 31 illustrates an example of a time-frequency resource of a PSFCH transmitted when a UE multiplexes several pieces of HARQ feedback and transmits the PSFCH by using one PRB, as an example of the present disclosure.

Specifically, as illustrated in FIG. 31, a PSFCH transmission UE may multiplex HARQ feedback on a PSSCH of slot 3 using subchannel #1 and HARQ feedback on a PSSCH of slot 7 using subchannel #2 and perform PSFCH transmission in slot 9 by using one PRB. In this case, as a frequency resource of the PSFCH transmitted in slot 9, i.e., the position of a PRB, a PRB of subchannel #2 corresponding to the position of a PSSCH transmitted in slot 7 using subchannel #2 requiring the most recently received feedback, the PRB being used for transmission of the PSFCH, is used. In this case, the feedback on the PSSCH received in slot 9 needs to be transmitted in the next PSFCH occasion rather than the PSFCH occasion of slot 9, and thus the position of the PRB of the PSFCH transmitted in slot 9 is irrelevant to the position of the PSSCH received in slot 9. In addition, a selection of a PRB within a subchannel follows a selection process of a PRB of a PSFCH by using IDs of a transmission UE and a reception UE in the legacy NR sidelink.

The next description is about a PSFCH code domain resource selection method when the NR PSFCH transmission UE multiplexes HARQ feedback and performs PSFCH transmission. In a case where an NR sidelink UE and an LTE sidelink UE co-exist in a co-channel, when postponing PSFCH transmission to the next NR PSFCH occasion slot, the NR PSFCH transmission UE may multiplex several pieces of HARQ feedback by using one PRB and transmit the same. The present disclosure proposes, as a method for distinguishing a PSFCH for transmitting postponed HARQ feedback from a PSFCH for transmitting HARQ feedback that is not postponed, application of different cyclic shifts. This is because the distinguishment in the code domain is required since the PSFCH for transmitting the postponed HARQ feedback and the PSFCH for transmitting the HARQ feedback that is not postponed use the PRBs positioned in the same time-frequency position. When the UE transmits two or less HARQ ACK bits, the UE may perform transmission by using a PSFCH format currently defined in the NR sidelink, and when the UE transmits three or more HARQ ACK bits, the UE may transmit the PSFCH by using PUCCH format 2 defined in the NR.

Figure 32:
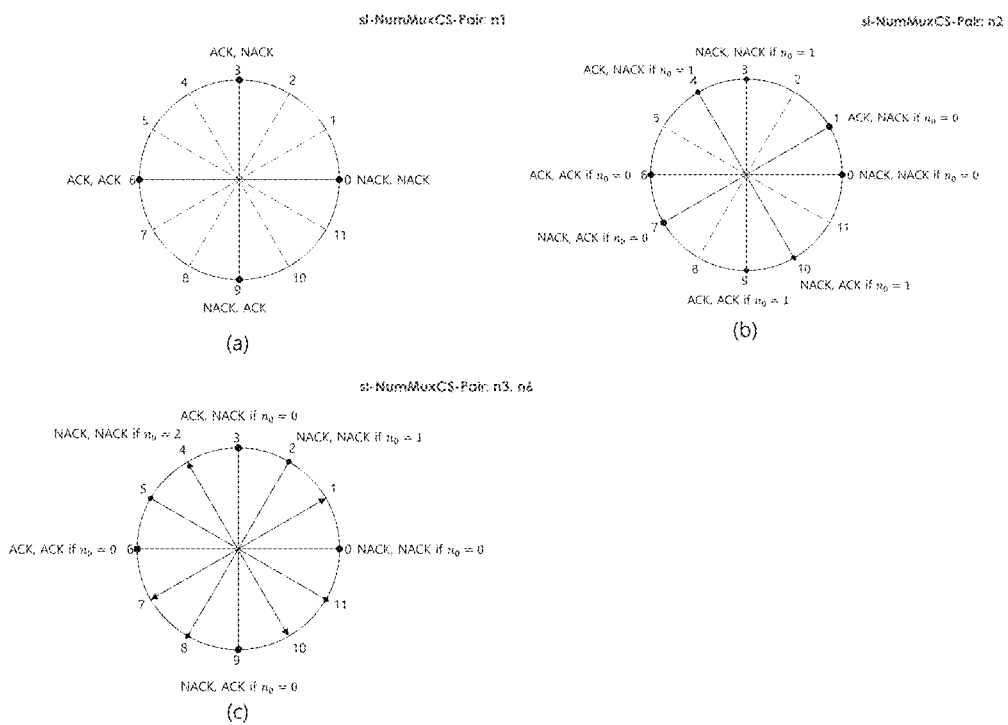
FIG. 32 illustrates a resource set configured for an NR sidelink UE when an LTE sidelink UE and the NR sidelink UE co-exist in a co-channel, as an example of the present disclosure.

FIG. 32 illustrates an example of a cyclic shift applied to a transmitted PRB when a UE multiplexes two pieces of HARQ feedback and transmits a PSFCH by using one PRB, as an example of the present disclosure.

Specifically, FIG. 32(*a*) illustrates an example of a cyclic shift value applied to multiplexed HARQ feedback which is postponed when the number of cyclic shift pairs available to a PSFCH transmission UE is configured to be one. In this case, a used PSFCH format may be a format defined in the legacy NR sidelink operation. In the legacy NR sidelink operation, when the number of cyclic shift pairs available for PSFCH transmission is configured to be one for the UE, the UE performs PSFCH transmission by applying 0 to a cyclic shift value for NACK feedback and applying 6 to a cyclic shift value for ACK feedback. The present disclosure proposes a method for transmitting one or more bits through multiplexing of HARQ feedback. FIG. 32(*a*) illustrates an example of a cyclic shift value applicable when an NR sidelink UE multiplexes and transmits two HARQ feedback bits for the co-existence with an LTE sidelink UE. When the pieces of feedback to be transmitted by the UE as feedback postponed to be transmitted and feedback to be newly transmitted are NACK feedback and NACK feedback, respectively, the UE may perform PSFCH transmission by applying 0 to the cyclic shift. When the pieces of feedback to be transmitted by the UE are ACK feedback and NACK feedback, respectively, the UE may apply 3 to the cyclic shift value, when pieces of feedback to be transmitted by the UE are NACK feedback and NACK feedback, respectively, the UE may apply 6 to the cyclic shift value, and when the pieces of feedback to be transmitted by the UE are NACK feedback and ACK feedback, respectively, the UE may apply 9 to the cyclic shift value. In this case, the applied cyclic shift value is an exemplary-value, and other values may be applied according to the types of HARQ feedback to be transmitted.

For example, FIG. 32(b) illustrates an example of each cyclic shift applied to multiplexed HARQ feedback when the number of available cyclic shift pairs is configured to be two for the UE, a PRB selection process for PSFCH transmission by using IDs of the transmission UE and the reception UE in the NR sidelink is followed, and initial values for determining cyclic shifts are determined to be 0 and 1, respectively. When the initial value is determined to be 0, the UE may use, as a cyclic shift value to be applied to the PRB, a value of (0, 1, 6, 7) to transmit each piece of HARQ feedback for ((NACK, NACK), (ACK, NACK), (ACK, ACK), (NACK, ACK)). In this case, the value of (0, 1, 6, and 7) is an exemplary value, and may be substituted by multiple values such as (0, 2, 6, 8), (0, 5, 6, 11), and (0, 4, 6, 10) and a HARQ feedback combination. When the initial value is determined to be 1, the UE may use, as a cyclic shift value to be applied to the PRB, a value of (3, 4, 9, 10) to transmit each piece of HARQ feedback for ((NACK, NACK), (ACK, NACK), (ACK, ACK), (NACK, ACK)). Similarly, the applied cyclic shift value and HARQ feedback type combination may be substituted by other values.

For example, FIG. 32(c) illustrates an example of each cyclic shift applied to multiplexed HARQ feedback when the number of available cyclic shift pairs is configured to be three for the UE, a PRB selection process for PSFCH transmission by using IDs of the transmission UE and the reception UE in the NR sidelink is followed, and initial values for determining cyclic shifts are determined to be 0, 1, and 2, respectively. A case where the number of cyclic shift pairs available for PSFCH transmission is configured to be six for the NR sidelink UE may follow the case where the configured number of cyclic shift pairs is three. When the initial value is determined to be 0, the UE may use, as a cyclic shift value to be applied to the PRB, a value of (0, 3, 6, 9) to transmit each piece of HARQ feedback for ((NACK, NACK), (ACK, NACK), (ACK, ACK), (NACK, ACK)). The corresponding mapping is exemplary, and the type of HARQ feedback mapped to each cyclic shift value may vary. When the initial value is determined to be 1, the UE may use, as a cyclic shift value to be applied to the PRB, a value of (2, 5, 8, 11) to transmit each piece of HARQ feedback for ((NACK, NACK), (ACK, NACK), (ACK, ACK), (NACK, ACK)). Similarly, the corresponding mapping is exemplary, and the type of HARQ feedback mapped to each cyclic shift value may vary. When the initial value is determined to be 2, the UE may use, as a cyclic shift value to be applied to the PRB, a value of (4, 7, 10, 1) to transmit each piece of HARQ feedback for ((NACK, NACK), (ACK, NACK), (ACK, ACK), (NACK, ACK)). Similarly, the corresponding mapping is exemplary, and the type of HARQ feedback mapped to each cyclic shift value may vary.

As another method for configuring and transmitting an NR PSFCH when an LTE sidelink UE and an NR sidelink channel co-exist in a co-channel, there may be a method in which NR sidelink UEs first use periodically configured NR PSFCH occasion slots for PSCCH, PSSCH, and PSFCH transmission. This is a method for excluding a subframe corresponding to an NR PSFCH occasion slot from a candidate resource set in the process of configuring an available candidate resource set through a result of RSSI sensing while the LTE sidelink UE performs resource allocation by using LTE sidelink resource allocation mode 4.

Figure 33:
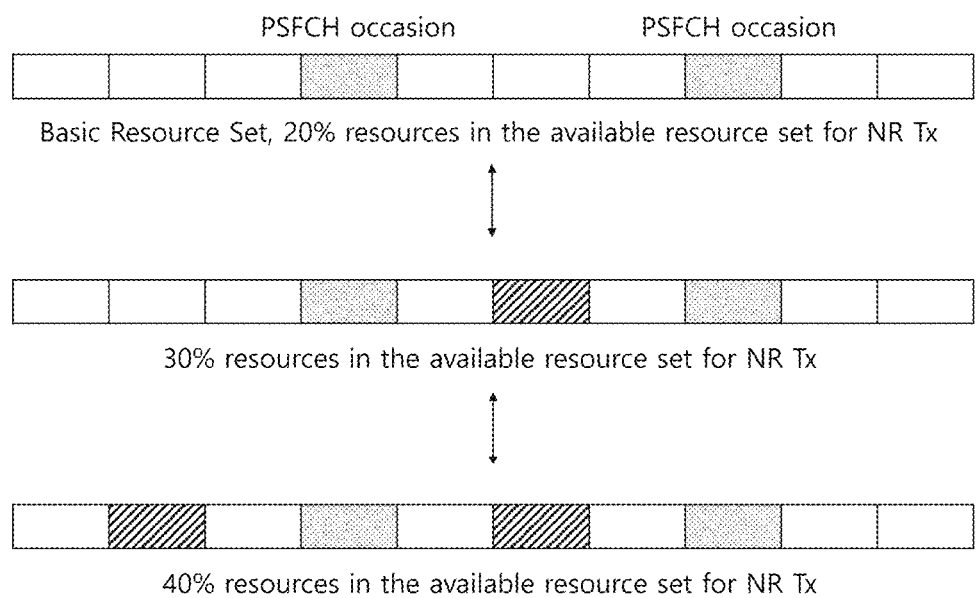
FIG. 33 illustrates an example of an operation of an NR sidelink UE for transmitting a PSFCH when transmission of an LTE sidelink UE is detected in an NR PSFCH occasion slot, as an example of the present disclosure.

FIG. 33 illustrates a resource set configured for an NR sidelink UE when an LTE sidelink UE and the NR sidelink UE co-exist in a co-channel, as an example of the present disclosure.

Specifically, as illustrated in FIG. 33, the NR sidelink UE may be configured with an NR sidelink resource pool, but when the LTE sidelink UE and the NR sidelink UE co-exist, an NR resource set may be configured within the configured NR sidelink resource pool. The NR resource set may be configured by a network, or the UE may configure the same by itself, the NR resource set may be periodically configured differently according to a ratio of LTE sidelink transmission to NR sidelink transmission in the corresponding channel, and to secure NR PSFCH transmission, a periodically configured NR PSFCH occasion slot is always included. For example, in FIG. 33, when the ratio of the NR sidelink transmission to the LTE sidelink transmission is very low, the NR sidelink UE may be configured with a basic resource set including an NR PSFCH occasion slot only, and NR PSSCH and PSFCH transmission are performed within the configured basic resource set only. When a ratio of the NR sidelink transmission increases in the same channel (co-channel) in the situation where the basic resource set is configured, the NR sidelink UE may additionally receive a configuration of a slot resource, in addition to the basic resource set. For example, as illustrated in FIG. 33, FIG. 33 shows that the NR sidelink UE is configured with a slot resource in additional to the basic resource set according to the ratio of the NR sidelink transmission in the corresponding channel and the ratios of the NR sidelink resource sets occupy 30% and 40%, respectively, compared to the configured resource pool. In this case, the NR sidelink basic resource set always includes NR PSFCH occasion, and thus the additionally configured resource set is a slot including PSCCH and PSSCH symbols only. The reason the NR PSFCH occasion slot is always included in the NR sidelink resource set is that by allowing the NR sidelink UEs to proactively use the periodically configured NR PSFCH occasion slot in the configured resource pool for PSSCH and PSFCH transmission, it can be expected that the LTE sidelink UE measures high RSSI for the past single-subframe resource. When the RSSI measurement values for the single-subframe resource corresponding to the NR PSFCH occasion slot gets larger, the LTE sidelink UE may remove the corresponding resources from the candidate resource set when performing a mode 4 resource allocation process, and may thus avoid selecting a PSFCH occasion slot used by the NR sidelink UE, thereby avoiding a problem which may be caused due to NR PSFCH transmission in an AGC control process of the LTE sidelink UE.

However, basically, the LTE sidelink UE cannot decode transmission of the NR sidelink UE, and thus may not be able to identify whether or not the NR sidelink transmission is performed, and a resource exclusion process based on a result of RSSI sensing may not be executed when a channel load is high. That is, the resources in the NR sidelink resource set configured for the NR sidelink UE may be used by the LTE sidelink UE. In this case, when the LTE sidelink UE uses a radio resource in the NR PSFCH occasion slot, ADC saturation may occur in an LTE sidelink reception process due to the NR PSFCH transmission.

To solve this problem, the present disclosure proposes an operation of an NR PSFCH transmission UE when an LTE sidelink UE uses a single-subframe resource in an NR PSFCH occasion slot for LTE PSCCH and LTE PSSCH transmission. The operation proposed in the present disclosure can be also used when the NR sidelink UE is configured with the NR sidelink resource set configured according to the ratio of the NR sidelink transmission, and can be also used when the NR sidelink UE is not separately configured with the NR sidelink resource set and operates within the previously configured sidelink resource pool. When the NR sidelink UE needs to transmit an NR PSFCH for the received NR PSSCH transmission, the NR PSFCH transmission UE performs PSFCH transmission in the NR PSFCH occasion slot. In this case, when the NR PSFCH transmission UE is scheduled to also perform NR PSSCH transmission in the corresponding slot, the NR PSFCH transmission UE performs both NR PSSCH transmission and NR PSFCH transmission regardless of whether the LTE sidelink transmission is performed in the corresponding slot. This is because the NR sidelink UE performs both NR PSSCH transmission and NR PSFCH transmission, and thus transmission is performed also in the first symbol of the corresponding slot, the LTE sidelink UE can perform AGC control appropriately, and thus the NR PSFCH transmission does not cause an ADC saturation problem for the LTE sidelink UE. However, in a case where the NR PSFCH transmission UE is to perform only NR PSFCH transmission without performing NR PSSCH transmission in an NR PSFCH occasion slot, when the NR PSFCH transmission UE has detected occurrence of transmission of the LTE sidelink UE in the corresponding slot or has recognized a resource reservation for the occurrence of the transmission of the LTE sidelink UE in the corresponding slot, the NR PSFCH transmission UE may drop NR PSFCH transmission and then postpone the same to the next NR PSFCH occasion slot. This may be a method for allowing the NR PSFCH transmission UE to avoid an ADC saturation problem which may be caused due to failure in performing ACG control appropriately by the LTE sidelink UE at a subframe start due to transmission of an NR PSFCH when the NR PSFCH transmission UE is to perform the transmission of the NR PSFCH without performing NR PSSCH transmission in the NR PSFCH occasion slot because the LTE sidelink UE can perform ACG control only at the subframe start.

Figure 34:
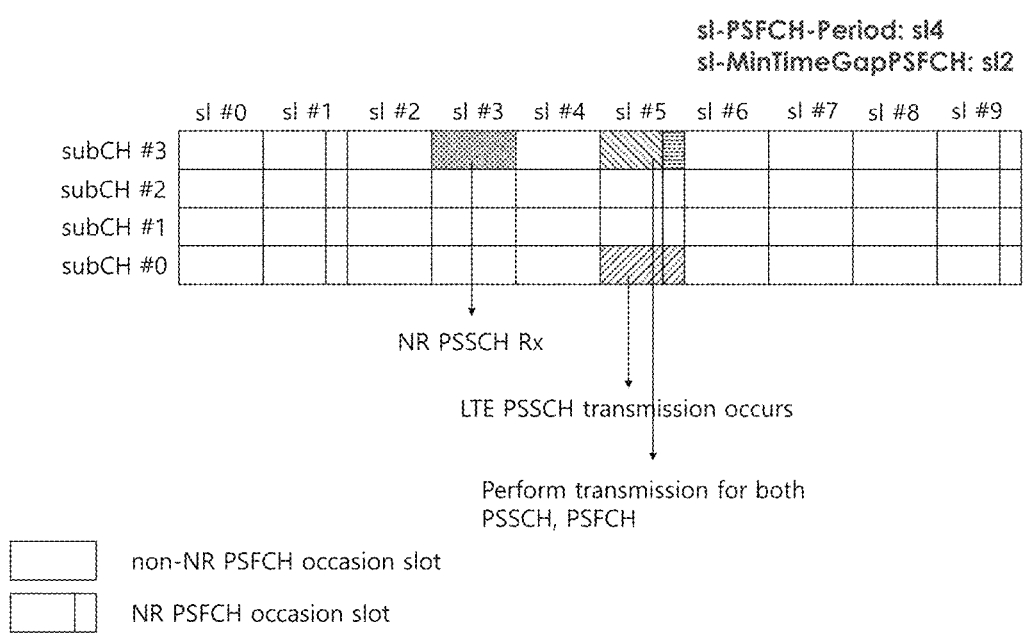
FIG. 34 illustrates an example of a condition for performing PSFCH transmission by an NR sidelink UE, as an example of the present disclosure.
Figure 35:
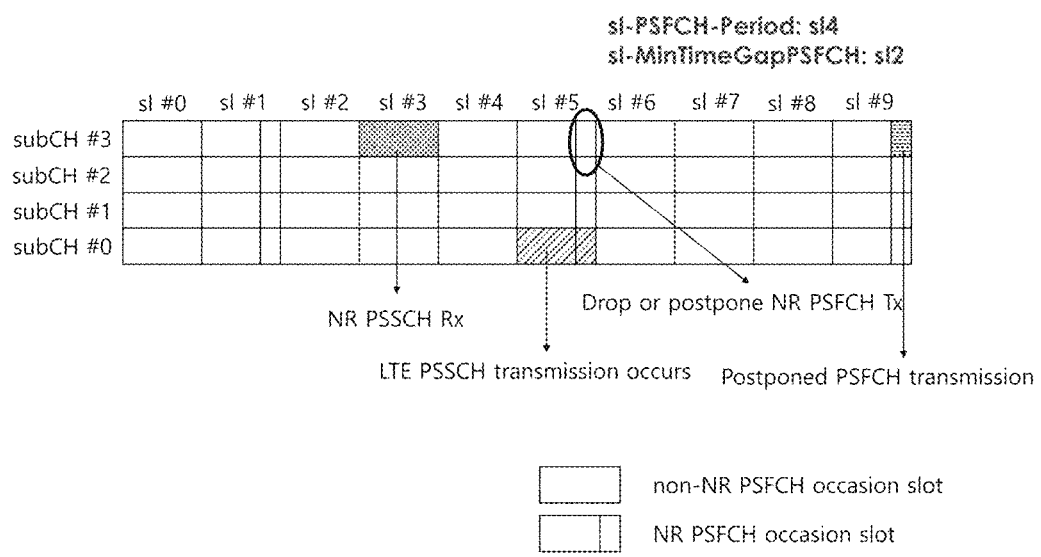
FIG. 35 illustrates an example of a condition in which an NR sidelink UE does not perform SFCH transmission, as an example of the present disclosure.

FIGS. 34 and 35 illustrate an example of an operation of an NR sidelink UE for transmitting a PSFCH when transmission of an LTE sidelink UE is detected in an NR PSFCH occasion slot, as an example of the present disclosure.

Specifically, FIGS. 34 and 35 illustrates an action of an NR PSFCH transmission UE when an NR sidelink UE detects LTE PSSCH transmission in subchannel 0 of slot 5 in a case where the NR sidelink UE is to perform NR PSFCH transmission in subchannel #3 of slot 5 by receiving NR PSSCH transmission in slot 3. For example, in FIG. 34, when the NR PSFCH transmission UE is to also perform NR PSSCH transmission in slot 5, the corresponding NR sidelink UE may perform both the NR PSSCH transmission and the NR PSFCH transmission. However, FIG. 35 shows a case where when the NR PSFCH transmission UE is to perform NR PSFCH transmission only in slot 5, the corresponding NR sidelink UE crops the NR PSFCH transmission or postpone the NR PSFCH transmission to the next NR PSFCH occasion slot. This is because the LTE sidelink transmission is detected in slot 5 in which the previous transmission is scheduled, the transmission of the NR sidelink UE is not considered in the ACG control process of the LTE sidelink UE, and thus the NR PSFCH transmission is not performed to secure stable communication of the LTE sidelink UE.

The NR sidelink UE may receive a configuration of three methods from a network, as PSFCH transmission methods, for the co-existence with the LTE sidelink UE in the same channel. The first method (method 1) is a method in which the NR sidelink UE does not perform PSFCH transmission in a slot in which LTE sidelink transmission is performed, in a channel in which the NR sidelink UE and an LTE sidelink UE co-exist. The second method (method 2) is a method in which an NR sidelink UE always perform PSFCH transmission in a slot corresponding to PSFCH occasion. The third method (method 3) is a method in which an NR sidelink UE conditionally performs PSFCH transmission in a slot corresponding to PSFCH occasion of a channel in which the NR sidelink UE and an LTE sidelink UE co-exist. In this case, method 3 is a method in which PSFCH transmission is performed conditionally or is not performed conditionally, and thus may be used as a part of method 1 or a part of method 2. In other words, even though the NR sidelink UE receives a configuration of method 1 from the network, the NR sidelink UE may perform PSFCH transmission if a specific condition is satisfied, and even though the NR sidelink UE receives a configuration of method 2 from the network, the NR sidelink UE may not perform PSFCH transmission if a specific condition is satisfied. For the third method, when the NR sidelink UE also performs NR PSCCH/PSSCH transmission in a slot corresponding to PSFCH occasion for transmission of a PSFCH on condition that the NR sidelink UE performs PSFCH transmission, the NR sidelink UE may perform both NR PSCCH/PSSCH transmission and NR PSFCH transmission by using the same transmission power in the corresponding slot.

In another embodiment of the present invention, an NR sidelink UE may perform PSFCH transmission.

In this embodiment, an NR sidelink UE and an LTE sidelink UE may co-exist in a co-channel. In addition, in this embodiment, the NR sidelink UE is configured with "sl-PSFCH-period" in slot 4, "sl-MinTimeGapPSFCH" in slot 2, and SCS of 15 kHz in the corresponding NR sidelink resource pool. When the NR sidelink UE receives an NR PSSCH in subchannel 3 of slot 3, upon the existing NR sidelink operation, the NR sidelink UE needs to perform PSFCH transmission by using one PRB of subchannel 3 of slot 5 according to a PSFCH transmission rule. However, in a case where the NR sidelink UE receives a configuration of method 3 from the network, or receives a configuration of method 1 and a configuration of performing conditional PSFCH transmission, the NR sidelink UE may perform NR PSFCH transmission only when performing NR PSCCH/PSSCH transmission in subchannel 3 of slot 5. The NR sidelink UE transmits the NR PSCCH/PSSCH and PSFCH in slot 5 by using the same transmission power, and thus the LTE sidelink UE performing LTE PSCCH/PSSCH transmission in subchannel 0 of subframe 5 performs the ACG operation, whereby an ADC saturation problem which may be caused by the NR PSFCH transmission can be prevented.

In method 3, in a case where the NR sidelink UE does not perform PSFCH transmission conditionally, when a time-frequency resource in which transmission of an LTE PSCCH/PSSCH is scheduled and a time-frequency resource in which PSFCH transmission is configured are overlapped with each other on condition that the PSFCH transmission is not performed, the NR sidelink UE may not perform PSFCH transmission. When the time-frequency position of the PSFCH resource configured for the NR sidelink UE and the time-frequency position of the LTE PSCCH/PSSCH transmission resource allocated by the LTE sidelink UE are overlapped with each other and transmissions of two UEs are performed in resources, respectively, the corresponding transmissions may not be correctly received from the perspective of the reception UEs.

In another embodiment of the present invention, an NR sidelink UE may not perform PSFCH transmission under a specific condition.

Specifically, this embodiment describes a situation in which an NR sidelink UE and an LTE sidelink UE co-exist in a co-channel. In addition, in this embodiment, the NR sidelink UE is configured with "sl-PSFCH-period" in slot 4, "sl-MinTimeGapPSFCH" in slot 2, and SCS of 15 kHz in the corresponding NR sidelink resource pool. When the NR sidelink UE receives an NR PSSCH in subchannel 3 of slot 3, upon the existing NR sidelink operation, the NR sidelink UE needs to perform PSFCH transmission by using one PRB of subchannel 3 of slot 5 according to a PSFCH transmission rule. However, when the NR sidelink UE receives a configuration of method 3 from the network, or receives a configuration of method 2 and a configuration of performing no PSFCH transmission conditionally, a resource corresponding to subchannel 3 of slot 5 is scheduled by the LTE sidelink UE in slot 0, and thus the NR sidelink UE does not perform NR PSFCH transmission. This may enable both the NR sidelink communication and the LTE sidelink communication to be stably performed.

In method 3, as another condition for determining whether the NR sidelink UE is to perform or not to perform PSFCH transmission, the priority of LTE sidelink traffic and an LTE PSSCH RSRP value may be considered so that NR PSFCH transmission can be performed conditionally. In this case, the priority of the NR PSFCH is equal to the priority of the NR PSCCH/PSSCH corresponding to the NR PSFCH, and the priority of the LTE PSCCH/PSSCH follows a value specified in a priority field of LTE SCI. When the time resource position of the configured NR PSFCH is identical to the position of a time resource which is reserved by the LTE sidelink UE for LTE PSSCH transmission, the NR sidelink UE may determine whether to transmit the PSFCH by using a threshold value that is dependent on the priority of reception traffic and the priority of transmission traffic, defined in an RRC parameter.

Figure 36:
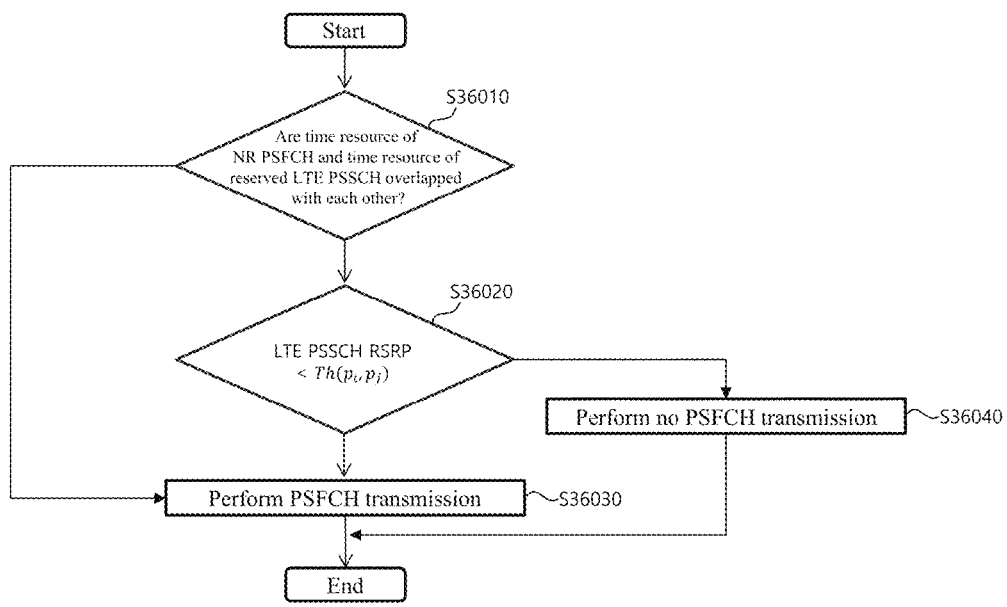
FIG. 36 is a flow chart illustrating an example of a PSFCH transmission method of an NR sidelink UE, as an example of the present disclosure.

FIG. 36 is a flow chart illustrating an example of a PSFCH transmission method of an NR sidelink UE, as an example of the present disclosure.

Specifically, the NR sidelink UE may measure the position of a time-frequency resource reserved by another LTE sidelink UE for LTE PSSCH transmission from an LTE sidelink module in the UE, priority value p_i from LTE SCI in which the corresponding reservation is performed, an LTE PSSCH RSRP value from LTE sidelink transmission in which the corresponding reservation is performed, etc. In this case, a priority value of a PSFCH to be transmitted by the NR sidelink UE is assumed as p_j. When the position of a time resource reserved by another LTE sidelink UE for LTE PSSCH transmission and the position of a PSFCH time resource configured by the NR sidelink UE are overlapped (S36010), the UE may compare the measured LTE PSSCH RSRP value with a threshold value that is dependent on p_i and p_j and configured via an RRC parameter (S36020). When the measured LTE PSSCH RSRP value is smaller than the threshold value, this may be determined that the other LTE sidelink UE which is to perform the transmission is far away from the NR sidelink UE which is to perform the PSFCH transmission and the LTE PSSCH RSRP signal has a value smaller than the threshold value. Alternatively, it may be determined that a channel and a signal transmitted from the other LTE sidelink UE which is to perform the transmission does not interfere with the NR sidelink UE which is to perform the PSFCH transmission, and vice versa, and thus the NR sidelink UE may perform PSFCH transmission (S6030). When the measured LTE PSSCH RSRP value is equal to or greater than the threshold value, this may be determined that the other LTE sidelink UE which is to perform the transmission is within a close distance from the NR sidelink UE which is to perform the PSFCH transmission and the LTE PSSCH RSRP signal has a value greater than the threshold value. Alternatively, it may be determined that a channel and a signal transmitted from the other LTE sidelink UE which is to perform the transmission may interfere with the NR sidelink UE which is to perform the PSFCH transmission, and vice versa. Therefore, the NR sidelink UE may not perform PSFCH transmission to prevent the reliability of the transmission of the LTE sidelink UE from being reduced due to the interference to the channel and the signal transmitted from the LTE sidelink UE (S36040).

When the NR sidelink UE and the LTE sidelink UE co-exist in the co-channel, the network may UE-specifically or UE group-specifically configure, from the NR sidelink UE, one of method 1, method 2, and method 3, as a method for performing PSFCH transmission. For example, when traffic transmitted by the NR sidelink UE is higher than that transmitted by the LTE sidelink UE in a specific area of a cell, the network may configure method 2 or method 3 for NR sidelink UEs in the corresponding area. The number of traffic transmissions by the NR sidelink UEs is greater than that by the LTE sidelink UEs, and thus the LTE sidelink UE may exclude an LTE subframe resource overlapped with NR PSFCH occasion in the LTE sidelink mode 4 resource allocation process when the network configures method 2 for the NR sidelink UE to allow the NR sidelink UE to transmit the PSFCH, or configures method 3 for the NR sidelink UE to allow the NR sidelink UE to transmit the PSFCH conditionally. For example, when the number of traffic transmissions by the LTE sidelink UE is greater than that by the NR sidelink UE in a specific area of a cell, the network may configure method 1 or method 3 for the UEs in the corresponding area. The number of traffic transmission by the LTE sidelink UE is greater than the number of traffic transmissions by the NR sidelink UE, and thus the network may configure method 1 for the NR sidelink UE to cause the NR sidelink UE not to perform NR PSFCH transmission in a slot in which the LTE sidelink transmission is performed, thereby securing LTE sidelink transmission, or may configure method 3 for the NR sidelink UE to allow the NR sidelink UE to transmit the PSFCH conditionally, thereby preventing the LTE sidelink from experiencing ADC saturation since NR PSFCH transmission is not performed or is performed conditionally in the corresponding subframe.

Figure 37:
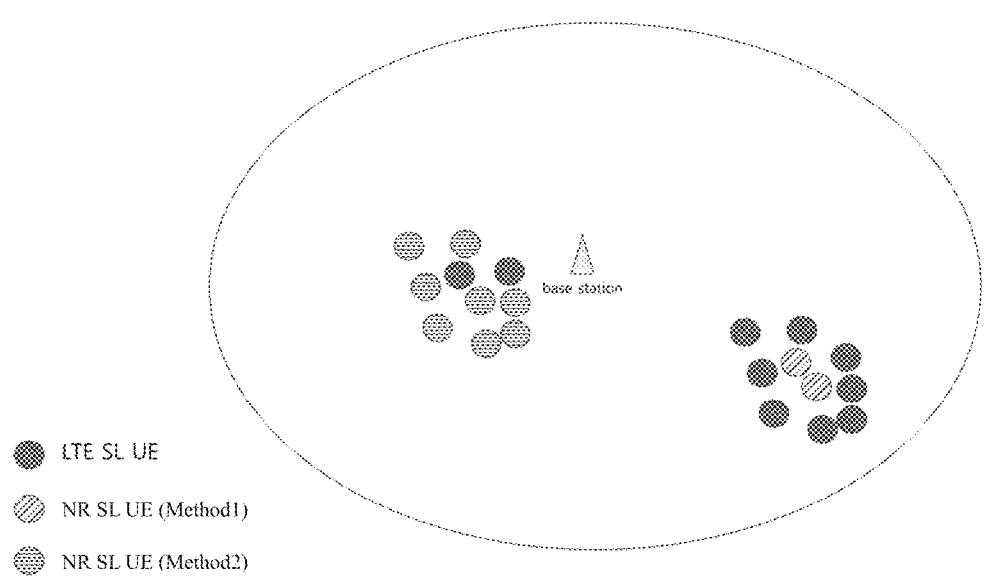
FIG. 37 illustrates an example of receiving a configuration of, as a UE-specific method, a PSFCH transmission method from a network by an NR sidelink UE in a cell, as an example of the present disclosure.

FIG. 37 illustrates an example of receiving a configuration of, as a UE-specific method, a PSFCH transmission method from a network by an NR sidelink UE in a cell, as an example of the present disclosure.

Specifically, FIG. 37 shows a situation in which when an NR sidelink UE and an LTE sidelink UE co-exist in a co-channel, a PSFCH transmission method is configured from a network as a UE-specific method according to traffic transmissions by LTE sidelink UEs and NR sidelink UEs in a specific area. FIG. 36 illustrates that in an area in which the number of traffic transmissions by LTE sidelink UEs and the number of traffic transmissions by NR sidelink UEs, the NR sidelink UE receives a configuration of method 1 as a PSFCH transmission method and performs PSFCH transmission only in a slot corresponding to NR PSFCH occasion having no LTE sidelink transmission. Conversely, an illustrated situation is that in an area in which the number of traffic transmissions by the NR sidelink UEs is greater than that by the LTE sidelink UEs, the NR sidelink UE receives a configuration of method 2 as a PSFCH transmission method and always perform NR PSFCH transmission. In this case, a receive signal strength indicator (RSSI) measured in a subframe corresponding to the NR PSFCH occasion is high, and thus the LTE sidelink UE may exclude single-subframe resources of the corresponding subframe from a candidate resource set in the process of performing LTE sidelink mode 4 resource allocation.

Figure 38:
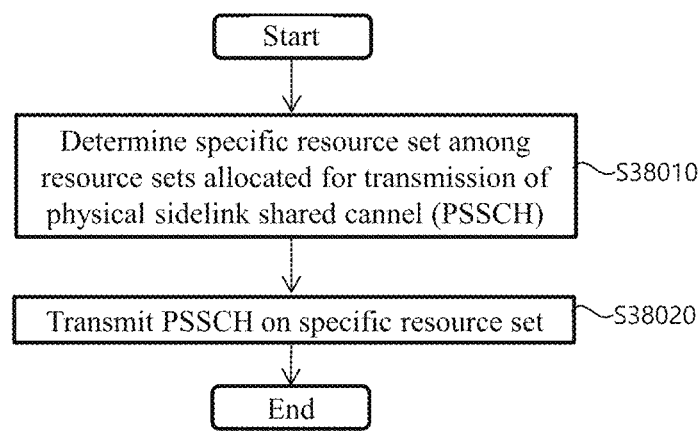
FIG. 38 is a flow chart illustrating an example of an operation of a UE according to an embodiment of the present disclosure.

FIG. 38 is a flow chart illustrating an example of an operation of a UE according to an embodiment of the present disclosure.

Referring to FIG. 38, in a case of a Type A UE, in which a UE includes both an NR sidelink module and an LTE sidelink module, the UE may transmit a specific signal (e.g., a PSSCH/PSCCH, etc.) through the NR sidelink module. In this case, the UE may determine a resource for transmitting the specific signal in consideration of a resource for a signal to be transmitted by an internal LTE sidelink module and/or another external LTE UE.

Specifically, the UE may be the Type A UE including both the NR sidelink module and the LTE sidelink module, and in this case, the UE may receive and decode not only an NR signal but also an LTE signal.

When transmitting a signal through the NR sidelink module, the Type A UE may determine, among resource sets including one or more candidate resources allocated for transmission of a specific signal (e.g., a PSSCH/PSCCH, etc.), a specific resource set for transmitting the specific signal (S38010).

In this case, when some or all of the one or more candidate resources constituting the resource sets are overlapped with a first resource for transmitting a first legacy signal of the UE and a first priority of the PSSCH is higher than a second priority of the legacy signal, the specific resource set may be determined by excluding at least one candidate resource overlapped with the first resource from among the one or more candidate resources. That is, the UE may determine a resource (a subset of resources) for transmitting the specific signal through the method described with reference to FIG. 24.

Thereafter, the UE may transmit the specific signal on the specific resource set (S38020).

When the first legacy signal is a periodically transmitted signal, the candidate resource set is allocated to each transmission period of the legacy signal, and the specific resource set may be determined in consideration of all the candidate resource sets allocated for each transmission period.

In this case, the UE may compare the first priority and the second priority, and some or all of the resource sets may be overlapped with a candidate resource set on the time axis.

The UE may receive, from an external UE (e.g., an LTE UE or a second UE), a second legacy signal including a third priority and resource allocation information of the second UE. In this case, when a second resource by the resource allocation information is partially or fully overlapped with the one or more candidate resources on the time axis, the UE may compare reference signal received power (RSRP) of the second legacy signal with a threshold value.

When the RSRP is greater than the threshold value, the UE may determine the specific resource set by further excluding at least one second candidate resource overlapped with the second resource by the resource allocation information from among the one or more candidate resources through the method described with reference to FIG. 25.

In this case, the threshold value may be selected from among multiple threshold values according to the first priority and the third priority. For example, according to the priorities, there may be 64 threshold values, and a specific threshold value may be selected, based on the priority of a signal to be transmitted and a received signal, from among the 64 threshold values.

The above-mentioned description of the present disclosure is for illustrative purposes, and it will be understood that those who skilled in the art to which the present disclosure belongs can easily modify the present disclosure in other specific forms, without altering the technical ideas or essential characteristics of the present invention. Therefore, the embodiments described above are illustrative and are not limited in all aspects. For example, each element described as a single entity may be distributed and implemented, and likewise, elements described as being distributed may also be implemented in a combined form.

The scope of the present disclosure is defined by the appended claims rather than the above detailed description, and all changes or modifications derived from the meaning and range of the appended claims and equivalents thereof should be interpreted as being included within the scope of the present disclosure.

The invention claimed is:

1. A terminal configured to operate in a wireless communication system, the terminal comprising:
   a communication module; and
   a processor configured to control the communication module,
   wherein the processor is configured to:
   determine a resource set for transmitting a physical sidelink shared channel (PSSCH), and
   transmit the PSSCH based on the determined resource set,
   wherein the resource set is determined by excluding a specific resource from a candidate resource set, and
   wherein the specific resource includes a first resource for transmitting a first specific PSSCH corresponding to a physical sidelink feedback channel (PSFCH) when a reserved resource of a legacy PSSCH to be transmitted by a legacy terminal overlaps with a resource for transmission of the PSFCH transmitted in response to the first sprcific PSSCH, and
   wherein the specific resource includes a second resource corresponding to a periodic resource for periodic transmission of the legacy PSSCH when the legacy PSSCH is transmitted periodically.

2. The terminal of claim 1,
   wherein a Reference Signal Received Power (RSRP) of the legacy PSSCH is greater than a threshold value.

3. The terminal of claim 1, wherein the processor is further configured to,
   receive sidelink control information (SCI) for transmission of the legacy PSSCH, and
   wherein the SCI includes reservation resource information of the reserved resource and priority information indicating a priority of the legacy PSSCH.

4. The terminal of claim 1,
   wherein the specific resource includes a third resource corresponding to a legacy resource when i) the legacy resource of a legacy signal to be transmitted by the terminal overlaps with a part of the candidate resource set and ii) a priority value of the legacy signal is lower than a priority value of a second specific PSSCH.

5. The terminal of claim 4,
wherein the third resource is optionally included in the specific resource when the priority value of the legacy signal is equal to or higher than the priority value of the second specific PSSCH.

6. A method performed by a terminal configured to operate in a wireless communication system, the method comprising:
- determining a resource set for transmitting a physical sidelink shared channel (PSSCH); and
- transmitting the PSSCH based on the determined resource set,
- wherein the resource set is determined by excluding a specific resource from a candidate resource set, and
- wherein the specific resource includes a first resource for transmitting a first specific PSSCH corresponding to a physical sidelink feedback channel (PSFCH) when a reserved resource of a legacy PSSCH to be transmitted by a legacy terminal overlaps with a resource for transmission of the PSFCH transmitted in response to the first specific PSSCH, and
- wherein the specific resource includes a second resource corresponding to a periodic resource for periodic transmission of the legacy PSSCH when the legacy is transmitted periodically.

7. The method of claim 6,
wherein a Reference Signal Received Power (RSRP) of the legacy PSSCH is greater than a threshold value.

8. The method of claim 6, the method further comprising:
receiving sidelink control information (SCI) for transmission of the legacy PSSCH, and
wherein the SCI includes reservation resource information of the reserved resource and priority information indicating a priority of the legacy PSSCH.

9. The method of claim 6,
wherein the specific resource includes a third resource corresponding to a legacy resource when i) the legacy resource of a legacy signal to be transmitted by the terminal overlaps with a part of the candidate resource set and ii) a priority value of the legacy signal is lower than a priority value of a second specific PSSCH.

10. The method of claim 9,
wherein the third resource is optionally included in the specific resource when the priority value of the legacy signal is equal to or higher than the priority value of the second specific PSSCH.

* * * * *